United States Patent

Myerson et al.

[11] Patent Number: 5,849,063
[45] Date of Patent: *Dec. 15, 1998

[54] PRODUCTION OF DIRECT REDUCED IRON AND/OR PIG IRON FROM INDUSTRIAL WASTE STREAMS

[75] Inventors: Allan S. Myerson, Brooklyn, N.Y.; Charles W. Sanzenbacher, Charlotte, N.C.; Peter J. Robinson, Fergus, Canada; Charles A. Burrows, Atlanta, Ga.; Paul R. DiBella, Ball Ground, Ga.

[73] Assignee: Metals Recycling Technologies Corp., Atlanta, Ga.

[ * ] Notice: The term of this patent shall not extend beyond the expiration date of Pat. No. 5,464,596.

[21] Appl. No.: 670,454

[22] Filed: Jun. 26, 1996

Related U.S. Application Data

[63] Continuation-in-part of Ser. No. 594,349, Jan. 29, 1996, Ser. No. 380,950, Jan. 31, 1995, Pat. No. 5,582,631, Ser. No. 360,394, Dec. 21, 1994, Pat. No. 5,571,306, and Ser. No. 439,352, May 11, 1995, Pat. No. 5,759,503, which is a continuation-in-part of Ser. No. 953,645, Sep. 29, 1992, Pat. No. 5,464,596, which is a continuation-in-part of Ser. No. 238,250, May 4, 1994, abandoned, which is a continuation-in-part of Ser. No. 820,987, Jan. 15, 1992, Pat. No. 5,208,004, said Ser. No. 380,950, is a continuation-in-part of Ser. No. 594,349, which is a continuation-in-part of Ser. No. 439,352, and Ser. No. 348,446, Dec. 2, 1994, abandoned, which is a continuation-in-part of Ser. No. 238,250, said Ser. No. 360,394, is a continuation-in-part of Ser. No. 348,446.

[51] Int. Cl.⁶ .................................................. C22B 19/34
[52] U.S. Cl. .................. 75/416; 75/419; 75/430; 75/504; 75/724; 75/961; 423/109
[58] Field of Search .............................. 75/416, 419, 430, 75/436, 504, 724, 961; 423/109

[56] References Cited

U.S. PATENT DOCUMENTS

| | | | |
|---|---|---|---|
| 4,389,040 | 6/1983 | Ulrich et al. | 266/137 |
| 4,765,829 | 8/1988 | Beckmann et al. | 423/97 |
| 5,464,596 | 11/1995 | Myerson et al. | 75/724 |
| 5,571,306 | 11/1996 | Myerson et al. | 75/430 |
| 5,582,631 | 12/1996 | Myerson et al. | 75/430 |
| 5,667,553 | 9/1997 | Keegel | 75/420 |

*Primary Examiner*—Melvyn Andrews
*Attorney, Agent, or Firm*—Deveau, Colton & Marquis

[57] ABSTRACT

A method for producing direct reduced iron or/and pig iron from an industrial waste materials stream such as EAF and blast furnace dust generally comprising the steps of separating the materials contained in the waste materials stream by magnetic separation or flotation, briquetting the iron-containing materials separated during the separation process with carbon, and providing the briquettes to a reduction furnace or/and to a small scale blast furnace or cupola furnace to produce direct reduced iron or/and pig iron, respectively. The exhaust streams from the process are further treated to recover chemical values and to allow the recycle of the exhaust streams to the main process.

48 Claims, 2 Drawing Sheets

PRODUCTION OF DIRECT REDUCED IRON AND/OR PIG IRON FROM INDUSTRIAL WASTE STREAMS

STATEMENT OF RELATED APPLICATIONS

This application is a continuation-in-part of (1) application Ser. No. 08/594,349, filed on Jan. 29, 1996, currently pending, which is a continuation-in-part of application Ser. No. 08/439,352, filed May 11, 1995, now U.S. Pat. No. 5,759,503, which is a continuation-in-part of application Ser. No. 08/238,250, filed May 4, 1994, issued as U.S. Pat. No. 5,464,596, which is a continuation-in-part of application Ser. No. 07/953,645, filed Sep. 29, 1992, now abandoned, which is a continuation-in-part of application Ser. No. 07/820,987, filed Jan. 15, 1992, issued as U.S. Pat. No. 5,208,004; (2) of application Ser. No. 08/439,352, filed on May 11, 1995, now U.S. Pat. No. 5,759,503, which is a continuation-in-part of application Ser. No. 08/238,250, filed May 4, 1994, issued as U.S. Pat. No. 5,464,596, which is a continuation-in-part of application Ser. No. 07/953,645, filed Sep. 29, 1992, now abandoned, which is a continuation-in-part of application Ser. No. 07/820,987, filed Jan. 15, 1992, issued as U.S. Pat. No. 5,208,004, (3) of application Ser. No. 08/380,950, filed on Jan. 31, 1995, issued as U.S. Pat. No. 5,582,631, which is a continuation-in-part of application Ser. No. 08/594,349, filed on Jan. 29, 1996, currently pending, which is a continuation-in-part of application Ser. No. 08/348,446, filed Dec. 2, 1994, now abandoned, which is a continuation-in-part of application Ser. No. 08/238,250, filed May 4, 1994, issued as U.S. Pat. No. 5,464,596, which is a continuation-in-part of application Ser. No. 07/953,645, filed Sep. 29, 1992, now abandoned, which is a continuation-in-part of application Ser. No. 07/820,987, filed Jan. 15, 1992, issued as U.S. Pat. No. 5,208,004; and (4) of application Ser. No. 08/360,394, filed on Dec. 21, 1994, issued as U.S. Pat. No. 5,571,306, which is a continuation-in-part of application Ser. No. 08/348,446, filed Dec. 2, 1994, now abandoned which is a continuation-in-part of application Ser. No. 08/238,250, filed May 4, 1994, issued as U.S. Pat. No. 5,464,596, which is a continuation-in-part of application Ser. No. 07/953,645, filed Sep. 29, 1992, now abandoned, which is a continuation-in-part of application Ser. No. 07/820,987, filed Jan. 15, 1992, issued as U.S. Pat. No, 5,208,004.

BACKGROUND OF THE INVENTION

1. Field of the Invention

The present invention relates generally to a process for the recovery of usable economically valuable products, including a relatively pure iron, direct reduced iron, and/or a very pure iron, pig iron, from industrial waste streams typically comprising heavy materials, such as iron oxide, cadmium, zinc and lead, and light materials, such as lime and ash. A waste materials stream comprising iron oxide, cadmium, zinc, lead, silica, lime and ash, such as electric arc furnace (EAF) dust or blast furnace dust, is subjected to a combination of steps including separation of the iron oxide from other materials in the waste materials stream by flotation or magnetic separation, briquetting the iron oxide (along with the other heavy materials if flotation is used) with carbon, and roasting the briquetted materials in a reduction furnace, such as a rotary hearth furnace, and/or liquefying the briquetted materials in a small scale blast furnace or cupola furnace to produce direct reduced iron (DRI) and/or pig iron, respectively. The other materials in the waste stream from which the iron oxide is separated also can be treated further to recover other chemical and metal values, as disclosed below.

During the roasting and liquefication processes, fumes are exhausted which typically comprise lead, zinc and cadmium. These fumes can be processed by a baghouse or/and by a wet scrubber and the captured materials can then be recycled to a recovery process wherein the captured materials are introduced into an ammonium chloride or sodium hydroxide leaching process which causes the zinc, cadmium, and lead constituents to go into solution while the iron and iron oxide which was not removed during the separation process remains undissolved. The undissolved iron and iron oxide is recycled to the process of the present invention where it is briquetted with carbon and roasted in a rotary hearth furnace or subjected to liquefication in the small scale blast furnace or cupola furnace to produce DRI or pig iron, respectively.

2. Prior Art

Industrial waste streams typically contain components which have economic value if they can be recovered in an economic fashion. For example, U.S. Pat. No. 3,849,121 to Burrows, now expired but which was assigned to a principal of the assignee of the present invention, discloses a method for the selective recovery of zinc oxide from industrial waste. The Burrows method comprises leaching a waste material with an ammonium chloride solution at elevated temperatures, separating iron from solution, treating the solution with zinc metal and cooling the solution to precipitate zinc oxide. The Burrows patent discloses a method to take EAF dust which is mainly a mixture of iron and zinc oxides and, in a series of steps, to separate out and discard the iron oxides and waste metals, so that the resulting zinc-compound-rich solution can be further treated to recover the zinc compounds.

Waste metal process dust typically has varying amounts of iron, lead, cadmium and other metals, in various forms, contained in the dust. The first step in the Burrows patent is the treating of the EAF dust with an ammonium chloride solution to leach any zinc oxide, lead oxide and cadmium oxide present in the dust into solution, without any leaching of the iron oxides present. The second step in the Burrows process is cementation in which the solution obtained from the initial leach is filtered to remove any remaining solids and then zinc dust is added. The third step in the Burrows patent then takes the filtrate from the cementation process and cools the filtrate and obtains what are called zinc oxide crystals. The Burrows patent does not teach the treatment or recovery of any values from the discarded iron oxide containing precipitates.

U.S. Pat. No. 4,071,357 to Peters discloses a method for recovering metal values which includes a steam distillation step and a calcining step to precipitate zinc carbonate and to convert the zinc carbonate to zinc oxide, respectively. Peter further discloses the use of a solution containing approximately equal amounts of ammonia and carbon to leach the flue dust at room temperature, resulting in the extraction of only about half of the zinc in the dust, almost 7% of the iron, less than 5% of the lead, and less than half of the cadmium. However, Peters does not disclose a method for further treating the removed components not containing zinc compounds.

Thus, there exists a need for a method which will allow the recovery of an iron product from industrial waste streams which can be subjected to further treatments, resulting in a relatively pure iron product, such as direct reduced iron, and/or a very pure iron product, such as pig iron, which can be used as the feedstock for other processes, such as a steel making process. The industrial waste streams of most interest for this invention include a typical electric arc furnace waste and blast furnace streams and the particulate matter filtered or otherwise removed from various substeps of the invention, particularly from the fumes of a reduction furnace, such as a rotary hearth furnace, or from the small scale blast furnace or cupola furnace. Producing an iron product with a minimum amount of impurities, such as zinc ferrite, lead and cadmium, is advantageous because the iron product can be used as the feedstock for steel production processes. A method which results in the recovery of an iron product has additional value in that the iron product can be sold for use in other processes. Furthermore, recovery and retreatment of exhaust and other waste products from the present invention and from other processes and subprocesses has a beneficial effect on the environment, and a beneficial, economic effect on the cost of the steel making process. The exhaust may be further processed by filtering it through a bag house to capture the particulate materials, and then subjecting the captured materials to leaching with ammonium chloride or sodium hydroxide to recover the iron and iron oxide which was not separated out during the separation step. The iron materials are then briquetted and sent to the reduction furnace and/or the blast furnace.

Iron is smelted, or refined, in a furnace in which iron ore, coke and limestone are heated. Scrap iron also can be used as a feed to the iron smelting furnace. Prior to introducing scrap iron to the furnace, it is de-scaled of iron oxide, or rust. The mill scale, as it is called, is a waste product typically disposed of and not used in the iron production process. Steel is basically an iron alloyed with other chemical elements. Scrap steel also can be used as a feed in the making of steel. Mill scale also is not used in the steel production process. Finding an economical and/or beneficial use for this mill scale would provide iron and steel mills an opportunity to dispose of the mill scale. Likewise, used batteries provide a waste disposal problem. Used batteries also are not typically used in the steel making process. Rather than disposal in a landfill, it generally is preferable to recycle the used batteries, which are rich in iron oxide. Finding an economical and/or beneficial use for used batteries would reduce the quantity of such material sent to landfills and provide a recycle for usable components. All of these iron oxide rich materials can be added to the waste stream feed which is fed into the present process.

As can be seen, there exists a need for a method which separates iron oxide from other materials contained in a waste stream and processes the iron oxide to create DRI and/or pig iron and which will allow exhausts and fumes from reduction or pig iron furnaces or the like to be filtered in a baghouse or/and a wet scrubber so that the iron oxide which was not recovered during the separation step can be recovered by leaching the captured materials and recycled back to the process of the present invention. This need is addressed by the present invention.

BRIEF SUMMARY OF THE INVENTION

In accordance with the present invention, a waste material combination typically comprising iron oxide, cadmium, zinc, lead, ash and lime is subjected to a separation process which can be either magnetic separation or flotation. The preferred waste material combination is EAF dust, or other furnace dusts from metals processing processes. To the dust, other waste materials can be added. For example, iron-rich wastes such as mill scale or used batteries, iron-poor wastes such as wastes from industrial processes, and other wastes containing economically valuable constituents may be added to the dust for recovery of the metals and chemicals values.

If flotation is used, the heavy materials such as iron oxide, cadmium, zinc and lead sink to the bottom of the liquid suspension used in the flotation process while the lighter materials such as lime and ash cling to bubbles produced by passing air through the suspension and are removed as a froth product. The heavy materials then are briquetted with carbon and sent either to a reduction furnace, such as a rotary hearth furnace, to produce DRI or to a small scale blast furnace or cupola furnace to produce pig iron. The light products such as lime and ash, which also may contain some iron and other compounds, are leached with an ammonium chloride or sodium hydroxide solution and the majority of the non-iron compounds either go into solution or float on top of the solution, whereas any iron oxide contained in the material being leached remains undissolved and sinks. The undissolved iron oxide then is sent to the briquetting step where it is briquetted with carbon and sent either to the rotary hearth furnace for producing DRI or to the small scale blast furnace or cupola furnace for producing pig iron.

If magnetic separation is used instead of flotation, the iron-based materials are magnetically separated from the non-iron materials. The iron-based materials then are briquetted with carbon and sent to the reduction furnace for producing DRI or/and to the small scale blast furnace or cupola furnace for producing pig iron. It is possible that some iron-based materials will remain with the non-iron materials even after magnetic separation. Therefore, the non-iron products are sent to the above-mentioned leaching process and are leached with either an ammonium chloride or sodium hydroxide solution to separate any iron or iron oxide from the non-iron materials. Any iron or iron oxide which remains with the substantially non-iron materials does not go into solution and is subsequently separated and sent to the briquetting process. Once the iron oxide has been briquetted with carbon, the briquettes are sent to the reduction furnace for producing DRI or/and to the pig iron furnace for producing pig iron.

When the briquettes are roasted in the reduction furnace and/or liquefied in the pig iron furnace, fumes are released which are sent to a bag house where they are captured. The captured materials, which generally comprise lead, zinc and cadmium, then are leached as discussed above in an ammonium chloride or sodium hydroxide solution and the undissolved iron oxide is then recycled to the briquetting process where it is briquetted with carbon and then sent to the reduction furnace for producing DRI and/or to the pig iron furnace for producing pig iron. The non-iron products and compounds then are subjected to further recovery steps for recovering metals and chemicals values.

Therefore, it is an object of the present invention to provide a method for recovering iron and iron oxide from an industrial waste stream, such as EAF and blast furnace dust, and for processing the iron and iron oxide to produce direct reduced iron and/or pig iron which can then be used in a steel making process.

It is another object of the present invention to provide a method for recovering iron and iron oxide from waste materials, such as fumes from a reduction furnace or small scale blast furnace or cupola furnace, which can be recycled to the process of the present invention for producing direct reduced iron and/or pig iron.

It is yet another object of the present invention to provide a method for recovering iron oxide which can be used as is as a feedstock for a steel making process.

It is yet another object of the present invention to provide a method for recovering other metal and/or chemical values such as cadmium, zinc, and lead from an industrial waste stream.

It is yet another object of the present invention to provide a process which uses the waste streams of various industrial processes, particularly the iron and steel making processes, so as to achieve an economical, environmentally friendly recycle process in the steel making industry.

It is yet another object of the present invention to provide a method for recovering iron and iron oxide from waste materials such as batteries and cars, to produce direct reduced iron and/or pig iron which can be used in a steel making process.

It is yet another object of the present invention to provide a method for recovering an iron product such as direct reduced iron, pig iron and/or iron oxide from an industrial waste material stream which minimizes waste and pollution, and is economical, quick and efficient.

These and other objects of the present invention will become apparent from the following detailed description, drawings and claims.

DETAILED DESCRIPTION OF THE PREFERRED EMBODIMENTS

The preferred embodiment of the present invention will now be described with reference to FIG. 1. A waste material stream 10 such as EAF dust typically comprises iron oxide, cadmium, zinc, lead, lime and ash. Waste material stream 10 may be the stream from subprocesses 400 and 500 as described below and in other related patent specifications. In order to separate the iron oxide from the other materials, the waste material stream 10 typically is sent to a separation process 600 which can be a flotation separation process 600A or a magnetic separation process 600B. X-ray analysis can be used to determine the composition of the products exiting subprocess 600.

Figure 1:
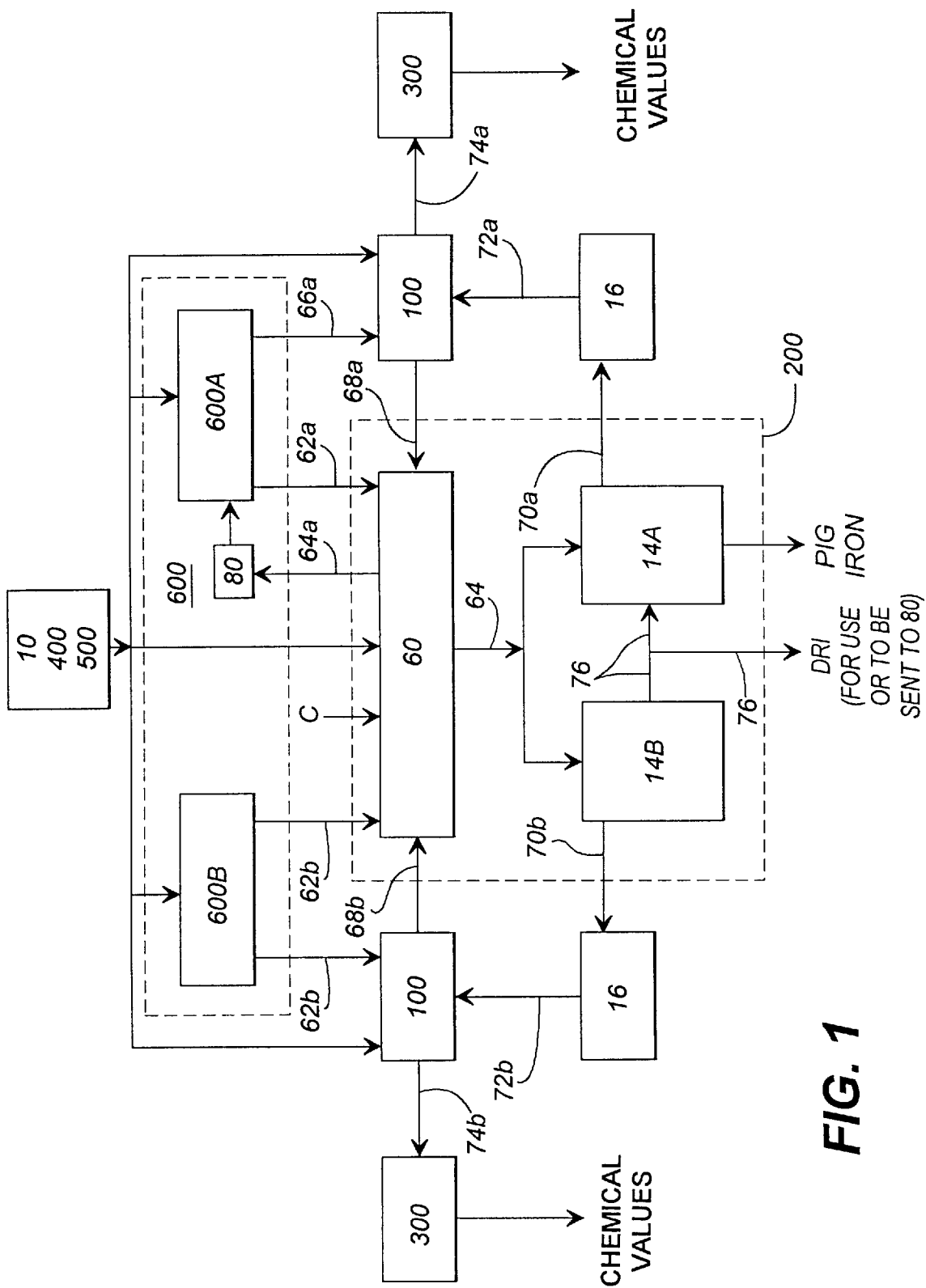
FIG. 1 is a schematic block diagram illustrating the process of the present invention.

The flotation separation process is illustrated schematically as block 600A in FIG. 1. When flotation is used, the heavy materials which generally comprise iron oxide, cadmium, zinc and lead sink to the bottom of the liquid suspension whereas the light materials which typically comprise lime, ash and silica cling to bubbles produced by passing air through the liquid suspension and are removed as a froth product. The heavy materials 62a are sent to the briquetting process 60 where they are briquetted with carbon C at a temperature ranging from approximately 50° F. to 250° F. The briquettes 64 then are sent to a reduction furnace 14B, such as a rotary hearth furnace, or/and to a pig iron furnace 14A for producing direct reduced iron or/and pig iron, respectively. The light materials 66a separated during the flotation step are sent to a leaching process, such as subprocess 100, where they are leached with an ammonium chloride or sodium hydroxide solution. During the leaching process, any iron oxide contained in the light materials 66a does not go into solution whereas other materials such as zinc, lead and cadmium compounds dissolve. Still other materials, such as the lights (lime and ash), do not go into solution, but float on the top of the solution. The undissolved iron oxide 68a is then separated from the solution and the lights and sent to the briquetting process 60 where it is briquetted with the heavy materials and then sent to the reduction furnace 14B or/and to the pig iron furnace 14A, as discussed above.

The magnetic separation process is illustrated schematically in FIG. 1 as block 600B. When magnetic separation is used, most of the iron-based products are separated from the non-iron products. The iron-based products 62b are sent to the briquetting process 60 where they are briquetted with carbon C at a temperature from 50° F. to 250° F. as discussed above. The briquettes 64 then are sent to the reduction furnace 14B or/and to the pig iron furnace 14A, as discussed above. The substantially non-iron product 66b (which may contain some iron product) is sent to a leaching process, such as subprocess 100. During the leaching process, the iron oxide does not go into solution whereas certain non-iron products dissolve. The undissolved iron oxide 68b then is sent to the briquetting process 60 and the briquettes 64 then are sent to the reduction furnace 14B or/and to the pig iron furnace 14A.

The briquettes 64 which are sent to the reduction furnace 14B are converted into direct reduced iron which can then be used in a steel making process. During the reduction process, fumes 70b are exhausted which typically comprise lead, zinc and cadmium. The fumes 70b are captured in a capture means 16, such as a baghouse or scrubber. The captured product 72b then is sent to leaching process 100. The undissolved iron oxide 68b resulting from the leaching process 100 then is recycled to the briquetting process 60 and the briquettes 64 then are sent to the reduction furnace 14B or/and to the pig iron furnace 14A. The materials which go into solution during the leaching process 100 constitute other values 74a which are recovered and may be further treated or used in other processes, such as subprocess 300.

The direct reduced iron 76 produced in the reduction furnace 14B can also be liquefied in pig iron furnace 14A as indicated on FIG. 1. Further, it should be noted that the process may involve only flotation and DRI production, only flotation and pig iron production, only magnetic separation and DRI production, or only flotation and pig iron production. The process and Figs. disclosed herein combine these processes for clarity, simplicity and to show their relatedness, but in no way is it necessary to have magnetic separation, flotation, DRI production and pig iron production all in the same process.

The briquettes 64 which are sent to the pig iron furnace 14A are liquefied to produce pig iron. During the liquification process, slag also is produced which typically comprises copper, manganese and other impurities which have not been previously separated out. Fumes 70a exhausted during the liquification process are captured by capture means 16. The captured materials then are sent to leaching process, such as subprocess 100. The undissolved iron oxide 68a resulting from the leaching process then is recycled back to the briquetting process 60 and the briquettes 64 are sent to reduction furnace 14B or/and to the pig iron furnace 14A for producing direct reduced iron 76 or/and pig iron.

In accordance with a second embodiment, the separation processes 600A and 600B can be bypassed. The unseparated waste materials 10 are sent directly to briquetting process 60 where they are briquetted with carbon C at temperatures ranging from approximately 50° F. to 250° F. The briquettes 64 then are fed to the reduction furnace 14B or/and to the pig iron furnace 14A. If the briquettes 64 are provided to the pig iron furnace 14A, the impurities such as zinc, lead, cadmium, silica and lime become slag which can be skimmed off. The iron-based products form pig iron which can be used in the steel making process. If the briquettes 64 are provided to a reduction furnace 14B, DRI is produced and any fumes 70b exhausted are captured by the capture means 16 and are provided to the leaching process. The resulting undissolved iron oxide 68b then is recycled back to the briquetting process 60, as discussed above. Therefore, although it is preferred that the waste material stream 10 first be subjected to a separation process prior to being briquetted, the waste materials can be briquetted without first being subjected to the separation process 600. When the briquettes 64 are subsequently subjected to the reduction 14B or/and liquification processes 14A, the iron and iron oxide is separated from the other materials as either slag (in the liquification process) or fumes (in the reduction process).

In accordance with a third embodiment, the separation processes 600A and 600B also can be bypassed. The unseparated waste materials 10 are sent directly to the leaching process, such as subprocess 100. The waste materials are leached, as disclosed above, with the iron compounds and other heavies 68 being sent to the briquetting process 60. The present process then continues as disclosed above.

In accordance with any of these three embodiments, an intermediate grinding step 80 can be employed. Briquettes 64a can be sent from briquetting process 60 to intermediate grinding step 80 where the briquettes 64a are ground into smaller pieces. The small pieces are reintroduced to the magnetic separation step 600A where iron compounds remaining may be separated from non-iron compounds, and the iron compounds sent back to the briquetting step 60. This step also can be employed when flotation separation 600B is used; however it generally is more effective when magnetic separation is used. This step can increase the iron concentration in the briquettes 64, causing a resulting increase in the quality of DRI produced in, reduction furnace 14B or/and lowering the amount of slag created in pig iron furnace 14A. Further, the DRI 76 produced in reduction furnace 14B can be sent to intermediate grinding step 80 for further purification by reseparation in subprocess 600 and rebriquetting in briquetting step 60. The DRI then can be sent to reduction furnace 14B in a cyclical fashion for even higher purity, or to pig iron furnace 14A for the production of pig iron. Intermediate grinding step 80 also can be employed if the heavy materials 62a or iron-based products 62b are not as high in iron concentration as desired, so as to produce a briquette 64 of higher iron concentration. The x-ray analysis disclosed above is one method for determining the iron concentration of heavy materials 62a or iron-based products 62b.

PREFERRED EMBODIMENT AS COUPLED WITH A COMPLETE IRON PRODUCT AND CHEMICAL VALUES RECOVERY AND RECYCLE METHOD

The present invention also can be coupled to the complete process shown in FIG. 2 and disclosed in more detail below for the recovery of usable economically valuable products from industrial waste streams typically comprising zinc compounds and iron compounds. The recoverable products include a relatively pure iron or direct reduced iron product feedstock, an iron oxide and an iron-carbon residual, and various chemical values such as zinc, cadmium and lead products. Primary recovery and recycle processes are disclosed and claimed in patents and patent applications filed by the present inventors and assigned to the assignee of this invention and specification.

A waste materials stream typically comprising zinc compounds and iron compounds, such as electric arc furnace (EAF) dust, is subjected to a combination of steps including leaching (digesting), resulting in a precipitate comprising iron oxides (an iron cake or IC), which then is subjected to roasting, resulting in an enriched iron compound (an enriched iron cake or EIC) which can be used as a feedstock for steel mills. The EIC typically is rich in direct reduced iron (DRI). Preferably, the precipitate containing iron oxides is removed from a process for the recovery of zinc oxide and zinc metal from industrial waste streams. During the recovery process, carbon compounds can be added to the waste stream, and a cake product is produced from the undissolved iron and carbon compounds, which also can be used as a feedstock for steel mills.

In general, as disclosed above, the recovery and recycling process of this invention utilizes the iron-rich materials produced by the process as a feedstock ultimately to a steel mill. The iron-rich materials either are processed either to a higher purity iron product which may be fed directly to a steel mill as the feed, or are fed directly to a small scale blast furnace or a cupola furnace. Fumes exhausted from the furnace can be processed by a baghouse or/and by a wet scrubber and the captured materials are then recycled. Fumes emanating from the furnace contain particulate matter, and may include potentially valuable zinc, cadmium, and lead constituents. The fumes are filtered in a baghouse, either at the steel mill's baghouse or at an independent baghouse. The filter cake, which is an iron-poor mixture, may be combined with the initial waste feed (such as EAF dust) to the present process and/or other iron-rich materials, and processed further according to the following disclosure.

An alternative method of removing the particulate matter from the reduction furnace fumes is the use of a wet scrubber, such as a venturi scrubber. The fume constituents soluble in water will be removed from the fumes by the recirculated water. The loaded recirculated water then may be introduced to an ammonium chloride or sodium hydroxide leach step. Alternatively, the wet scrubber can use an ammonium chloride or sodium hydroxide solution instead of water. The particulate matter soluble in ammonium chloride, such as for example zinc, cadmium, and lead constituents, or in sodium hydroxide, will be removed in the ammonium chloride solution or sodium hydroxide solution, respectively, in the wet scrubber. The loaded ammonium chloride solution or sodium hydroxide solution then can be combined with the leaching step discussed above, resulting in an exceptional increase in the recycle of waste streams from, for example, the steel making process. Recovery and retreatment of exhaust and other waste products from the present invention and from other processes and subprocesses has a beneficial effect on the environment, and a beneficial, economic effect on the cost of the steel making process.

Scrap iron also can be used as a feed to the iron smelting furnace. Prior to introducing scrap iron to the furnace, it is de-scaled of iron oxide, or rust. The mill scale, as it is called, is a waste product typically disposed of and not used in the iron production process. Steel is basically an iron alloyed with other chemical elements. Scrap steel also can be used as a feed in the making of steel. Mill scale also is not used in the steel production process. Finding an economical and/or beneficial use for this mill scale would provide iron and steel mills an opportunity to dispose of the mill scale. Likewise, used batteries provide a waste disposal problem. Used batteries also are not typically used in the steel making process. Rather than disposal in a landfill, it generally is preferable to recycle the used batteries, which are rich in iron oxide. Finding an economical and/or beneficial use for used batteries would reduce the quantity of such material sent to landfills and provide a recycle for usable components. All of these iron oxide rich materials can be added to the waste stream feed which is fed into the present process. Additionally, iron-poor materials can be added to the waste stream feed for the present invention. Iron-poor materials comprising chemical values recoverable in the present process can be added, resulting in the recycle of waste streams which otherwise would be disposed of in, for example, landfills, and the recovery of chemical values which otherwise would be wasted.

The preferred iron-poor waste feed stream is taken from fumes emanating from industrial processes. For example, fumes from reduction furnaces and from the iron and steel making processes typically are filtered in baghouses. Other industrial processes also produce fumes which may be filtered in baghouses. The waste product removed from the fumes in the baghouses may be subjected to the present process for recovery of chemical values and production of an iron-rich product. Likewise, the fumes emanating from direct-reduced iron reduction furnaces may be filtered, with the filtrate recycled to the present process. Alternatively, the fumes may be cleaned using a recirculating water or ammonium chloride solution wet scrubber. The loaded recirculating water or ammonium chloride solution (the scrubbant) may be recycled to the ammonium chloride leach step of the present invention, as discussed below. Alternatively, a sodium hydroxide leach step can be used, depending on the chemical values to be recovered.

a. Ammonium Chloride Leach

The combined waste material is leached with an ammonium chloride solution resulting in a product solution (leachate) and undissolved materials (precipitate). In the leaching step, the zinc and/or zinc oxide dissolves in the ammonium chloride solution along with other metal oxides contained in the waste material, such as lead oxide and cadmium oxide. The resultant solution is filtered to remove the undissolved materials, including iron oxides and inert materials such as silicates, which will not dissolve in the ammonium chloride solution. The product solution and the undissolved materials are separated, with both the product solution and the undissolved materials being further treated to recover valuable components. For example, the remaining product solution can be treated to produce a zinc oxide product of 99% or greater purity. Alternatively, the remaining product solution can be subjected to electrolysis in which zinc metal plates onto the cathode of the electrolysis cell. Any remaining product solution after crystallization or electrolysis can be recycled back to treat incoming waste material.

The undissolved material separated from the product solution is rich in iron oxides, and typically has some impurities such as zinc ferrite. The undissolved materials can be used without further treatment as a feedstock for steel mills so long as the quantity of impurities is not too great. It is preferable, however, to remove the impurities from the iron oxide prior to using the iron oxide as a feedstock. Even more preferably, reducing the iron oxide to DRI is desired as DRI can be used to replace part or all of the steel scrap charge. Many steelmakers purchase DRI produced through other processes off site to add to the steelmaking process. The process can be carried out on site and can recover valuable constituents, including possibly some wasted iron constituents, normally exhausted from the steelmaking process.

The iron oxide is converted to the usable feed as disclosed above. To assist in the formation of a more usable direct reduced iron, the undissolved materials can be pelletized with carbon or sodium silicate, or another suitable material, at the end of or after the roasting step. Second, carbon, in the form of activated carbon, carbon dust, carbon pellets or the like, can be introduced to the ammonium chloride and waste material mixture during the leaching process. Third, carbon can be introduced to the dried undissolved material cake. When the iron oxide and carbon are heated under a reducing atmosphere, such as CO or $CO_2$ or other common reducing gases, the carbon will react with the iron oxide, assisting in reducing the iron oxide to DRI. Combining any of these methods can result in an even purer direct reduced iron product.

Prior to being leached by the ammonium chloride solution, the waste material mixture, which typically includes franklinite and magnetite, may be preroasted at temperatures greater than 500° C. for a predetermined period of time. The preroasting causes a decomposition of the franklinite zinc oxide-iron oxide complex into zinc oxide, iron oxide and other components. The preroasting process generally comprises the steps of adding heat to the waste material mixture and/or passing heated reducing gases through the waste material mixture. Although all reducing gases are suitable, hydrogen and carbon-containing gases such as carbon dioxide are preferred, as well as mixing carbon (activated) with the waste material mixture and preroasting in a gas containing oxygen. While some iron oxide is reduced from $Fe_2O_3$ and $Fe_3O_4$ to FeO, no elemental iron is produced during the preroasting step. Additionally, iron and iron oxides are not soluble to any degree in the basic ammonium chloride solution.

The invention also provides a method by which iron-rich by-products produced by the recovery process are reduced in a reduction furnace which reduces the iron oxide to DRI. Fumes exhausted by the reduction furnace are filtered through a baghouse or/and a wet scrubber. The materials captured by the baghouse or/and wet scrubber then may be recycled back into the leaching step of the recovery process of the present invention where they are used in the recovery process. The solid particles captured by the baghouse may be combined with the primary waste stream feed, such as EAF dust, or, alternatively, fed as a separate primary feed to the ammonium chloride leach. The loaded scrubbant liquid from the wet scrubber may be combined with the primary ammonium chloride leachant or, alternatively, if an ammonium chloride solution is used as the scrubbing liquid, used as the primary ammonium chloride leachant.

If the flumes are filtered through a baghouse, the captured materials will be solids which are placed into the waste material stream whereby they are added to the ammonium chloride solution of the leaching step. If the fumes are filtered through a wet scrubber, the captured materials will be discharged from the wet scrubber in a liquid stream directly into the ammonium chloride solution of the leaching step. Alternatively, if ammonium chloride is used as the scrubbing liquid, the ammonium chloride scrubbant may be used as the leaching (digesting) solution. If the scrubbant becomes too loaded, make-up ammonium chloride can be added. If the wet scrubber uses an ammonium chloride solution as the scrubbing liquid, it should be maintained at approximately 90° C. and 23% by weight ammonium chloride in water.

b. Sodium Hydroxide Leach

Many of the uses of zinc oxide require that the zinc oxide have certain particular size, shape and purity characteristics. Therefore, many grades of zinc oxide having different purity and particle characteristics have been developed to meet the diverse industry requirements. Today, most zinc oxide is made by the so called French Process which involves controlled burning of zinc metal vapor in air to obtain zinc oxide having exceptional chemical purity. This invention provides a zinc oxide purification process which involves precipitating zinc oxide in such a manner that the desired purity and particle characteristics can be obtained. One method to control particle size is through the control of the conditions of the washing step. Additionally, although the zinc oxide purification process preferably utilizes a sodium hydroxide solution as the intermediate, the purification process of the present invention also provides for preparation of zinc oxide having particular purity and particle characteristics by utilizing intermediates such as ammonium chloride liquor, ammonium sulfate, ammonium phosphate, potassium hydroxide, ammonia/ammonium oxalate and ammonia/ammonium carbonate solutions. Once the zinc oxide has been dissolved in the solution, controlled dilution results in the precipitation of zinc oxide having predetermined purity and particle characteristics.

In this part of the invention, once the essentially pure zinc oxide has been recovered, the zinc oxide is further purified by a process which is preferably based on the solubility of zinc oxide in a concentrated sodium hydroxide solution. This final purification process can be controlled in such a manner that the particle size and surface area of the zinc oxide produced can be controlled. Additionally, zinc compounds can be quickly, easily, and economically, synthesized from the aqueous zinc oxide slurry resulting from this process.

One method for purifying zinc oxide to obtain zinc oxide crystals having predetermined purity and particle characteristics comprises the steps of dissolving a zinc oxide containing product in an intermediate, filtering out any undissolved materials, precipitating zinc oxide crystals out of the intermediate in a controlled manner such that the zinc oxide crystals have predetermined purity and particle characteristics, filtering out the zinc oxide crystals, washing the zinc oxide crystals, and then drying the zinc oxide crystals.

The intermediate is preferably selected from the group consisting of sodium hydroxide, ammonium sulfate, ammonium chloride liquor, ammonium phosphate, potassium hydroxide, ammonia/ammonium oxalate, and ammonia/ammonium carbonate solutions. Most preferably, the intermediate is a concentrated 50%–70% sodium hydroxide solution. The precipitation step is accomplished by diluting the solution at a predetermined rate by a factor ranging from 3 to 30 at a temperature ranging from about 25° C. to 100° C. at atmospheric pressure, and even over 100° C. at pressures greater than atmospheric pressure, to precipitate the zinc oxide crystals.

The preferred method for purifying zinc oxide to obtain zinc oxide crystals having predetermined purity and particle characteristics comprises controlling the method by which the intermediate, preferably sodium hydroxide, is added to the zinc oxide can be used to control the particle size of the resulting purified zinc oxide. Preferably, the sodium hydroxide is dispersed into droplets averaging in size from 100 to 300 microns, with 150–250 microns being preferred, and the best results being obtained at 180 microns. Generally, the smaller the droplet size the larger the surface area of the resulting zinc oxide particles.

Once the substantially pure zinc oxide is recovered from the preliminary process, the purification process takes place resulting in zinc oxide which is at least 99.8% pure. In the preferred embodiment, this purification process is based on the solubility of zinc oxide in a concentrated sodium hydroxide solution. In the preferred process, zinc oxide is dissolved in a concentrated 50%–70% sodium hydroxide solution. Most of the metal impurities contained in the zinc oxide will not dissolve, including manganese, iron and cadmium. Any lead, calcium or chloride contained in the zinc oxide will dissolve. The solution is then filtered to remove the undissolved solids, which are then recycled back to the metals recovery section of the plant and thereby returned to the recycling process of the present invention.

The solution is then diluted by a factor ranging from 3 to 30, and preferably 3 to 8. The dilution preferably is performed hot at temperatures at or above 70° C., preferably at temperatures ranging between 90° to 100° C., so that the dilution step favors the formation of zinc oxide as compared to zinc hydroxide. The zinc oxide crystals which form are then filtered out, sent to a wash tank where they are washed with water, and sent to a dryer where they are dried, preferably at a temperature of 160° C.

The diluted sodium hydroxide solution then is sent to an evaporated condenser where the solution is concentrated back to 50%–70% sodium hydroxide so that it can be reused. When a steady state has been achieved, this step will result in the formation of sodium chloride crystals which will be filtered out of the solution and recovered. This is because sodium chloride formed by the chloride present in the zinc oxide is less soluble in a concentrated sodium hydroxide solution than in dilute sodium hydroxide. After the sodium chloride is filtered out, the concentrated solution can be reused in the purification process of the present invention. Periodically, lead will be removed from the sodium hydroxide solution by cementation. This involves the addition of zinc dust which will displace the lead in solution. The lead will be filtered out and sent to the lead recovery portion of the plant.

By controlling the manner in which the zinc oxide precipitates out of the intermediate during the zinc oxide crystallization step, it is possible to control the particle size hence the surface area of the zinc oxide produced as well as the purity. Furthermore, the purification process of the present invention can be used to purify zinc oxide obtained from other sources.

C. General Method Including Ammonium Chloride Leach

By taking an iron cake comprising for the most part iron oxides, and roasting it at elevated temperatures under a reducing atmosphere, a product can be made which is equivalent to direct reduced iron. In general terms, heating the iron cake above 980° C. up to about 1260° C., and typically no higher than 1315° C., a direct reduced iron product is formed. This direct reduced iron product then can be pelletized with carbon or with a sodium silicate, or other suitable compound, after it comes out of the furnace. The final product then can be used as a feedstock for steel mills without any additional treatment.

As discussed below, the additional step of roasting the iron cake, which is the undissolved precipitate, to reduce the iron oxide and to drive off any zinc, cadmium, and lead, and other impurities, is added to the end of a zinc oxide recovery process. The resulting iron product may have been reduced from several forms of the iron, such as FeO, $Fe_2O_3$, or $Fe_3O_4$, reduced to an iron extremely usable as the feedstock for steel mills.

The waste material, such as the combination of iron poor materials from a baghouse or wet scrubber and EAF flue dust, is leached using ammonium chloride, and the remaining undissolved precipitate is, for the most part, an iron oxide cake. Iron-rich materials also may be added to be leached and further processed. During the roasting of the undissolved precipitate, the bond to the non-leachable zinc oxide-iron oxide complex, franklinite, contained in the undissolved precipitate is broken, and the zinc oxide compounds are exhausted in the off gas and captured in a pollution control device, such as a baghouse, leaving the iron oxide cake as the residue. The iron oxide cake is roasted at an elevated temperature, causing the reduction of the iron oxide, leaving the iron metal values. The iron then can be mixed with a binder and formed into briquettes or cubes to be used as the feedstock. The exhausted impurities then can be recycled to recover, for example, zinc oxide, cadmium metal, and lead metal.

The method for recovering an iron product feedstock disclosed herein is carried out in its best mode in recovering the waste material from the waste streams of industrial or other processes, and combining it with waste material recovered from furnace exhaust streams. Many processes produce an iron poor waste stream, such as reduction furnaces and iron and steel making processes. Many other processes produce an iron oxide rich waste stream. Other processes remove iron oxide rich materials prior to processing. The iron poor materials are combined with a typical industrial waste stream which, after treatment, results in an iron-rich material suitable for use as a feedstock to a steel mill. Iron oxide rich materials also can be combined with the typical industrial waste stream and the iron poor waste stream. A typical industrial waste stream used is a flue gas where the charge contains galvanized steel, having the following percent composition:

TABLE I

Analysis of Flue Dust

| Component | Percent By Weight |
|---|---|
| Zinc Oxide | 39.64 |
| Iron Oxide | 36.74 |
| Lead Oxide | 5.72 |
| Inert Materials | 9.10 |
| Calcium Oxide | 2.80 |
| Potassium Oxide | 2.41 |
| Manganese Oxide | 1.29 |
| Tin Oxide | 1.13 |
| Aluminum Oxide | 0.38 |
| Magnesium Oxide | 0.33 |
| Chromium Oxide | 0.16 |
| Copper Oxide | 0.06 |
| Silver | 0.05 |
| Unidentified Materials | 0.22 |

General Process Description

Generally, the present process is a continuous method for the recovery of an iron product feedstock from waste material streams. The basic process steps comprise:

Basic Process Steps
a. combining a typical industrial process waste material stream, such as from a metal or metal product process, with an iron poor waste material, such as from a reduction furnace or the iron and steel making processes;
b. treating the waste material combination with an ammonium chloride solution at an elevated temperature to form a product solution and an undissolved precipitate comprising iron oxide;
c. separating the product solution from the undissolved precipitate comprising the iron oxide; and
d. further treating the undissolved precipitate in a roasting process resulting in the recovery of a relatively pure iron product.

The iron poor waste material, if in solid form such as from a baghouse, is added to Basic Process Step a. Alternatively, the iron poor waste material, if in solution form such as from a wet scrubber, is added to Basic Process Step b.

To the basic process steps, a number of additional steps may be added depending on the process conditions and iron properties desired. The additional steps include, either individually or in some combination:

1. preroasting the solid waste material at an elevated temperature;
2. preroasting the solid waste material at an elevated temperature and in a reducing atmosphere;
3. pretreating the solid waste material with an ammonium chloride solution at an elevated temperature to form a product solution and an undissolved precipitate comprising iron oxide, separating the product solution from the undissolved precipitate, roasting the undissolved precipitate at an elevated temperature and optionally in a reducing atmosphere, and then treating the undissolved precipitate with an ammonium chloride solution at an elevated temperature to form a product solution and an undissolved precipitate comprising iron oxide, and separating the product solution from the undissolved precipitate; and/or
4. preroasting the solid waste material at an elevated temperature and optionally in a reducing atmosphere, pretreating the waste material with an ammonium chloride solution at an elevated temperature to form a product solution and an undissolved precipitate comprising iron oxide, separating the product solution from the undissolved precipitate, roasting the undissolved precipitate at an elevated temperature and optionally in a reducing atmosphere, and then treating the undissolved precipitate with an ammonium chloride solution at an elevated temperature to form a product solution and an undissolved precipitate comprising iron oxide, and separating the product solution from the undissolved precipitate.

To the basic process steps, additional iron product purification steps may be added. For example:

1. elemental carbon can be added during the leaching step or steps to initiate the reduction of the iron oxide into direct reduced iron during the leaching step or steps. The elemental carbon may be added in a number of forms including, but not limited to, dust, granules, and pellets. The elemental carbon does not go into solution and remains with the undissolved precipitate.
2. elemental carbon can be added to the undissolved precipitate after it has been separated from the product solution. Combining elemental carbon and iron oxide in this manner at an elevated temperature and under a reducing atmosphere also will initiate the reduction of the iron oxide into direct reduced iron. The elemental carbon can be mixed into the undissolved precipitate in a number of manners including, but not limited to ribbon blenders and mixers.

Figure 2:
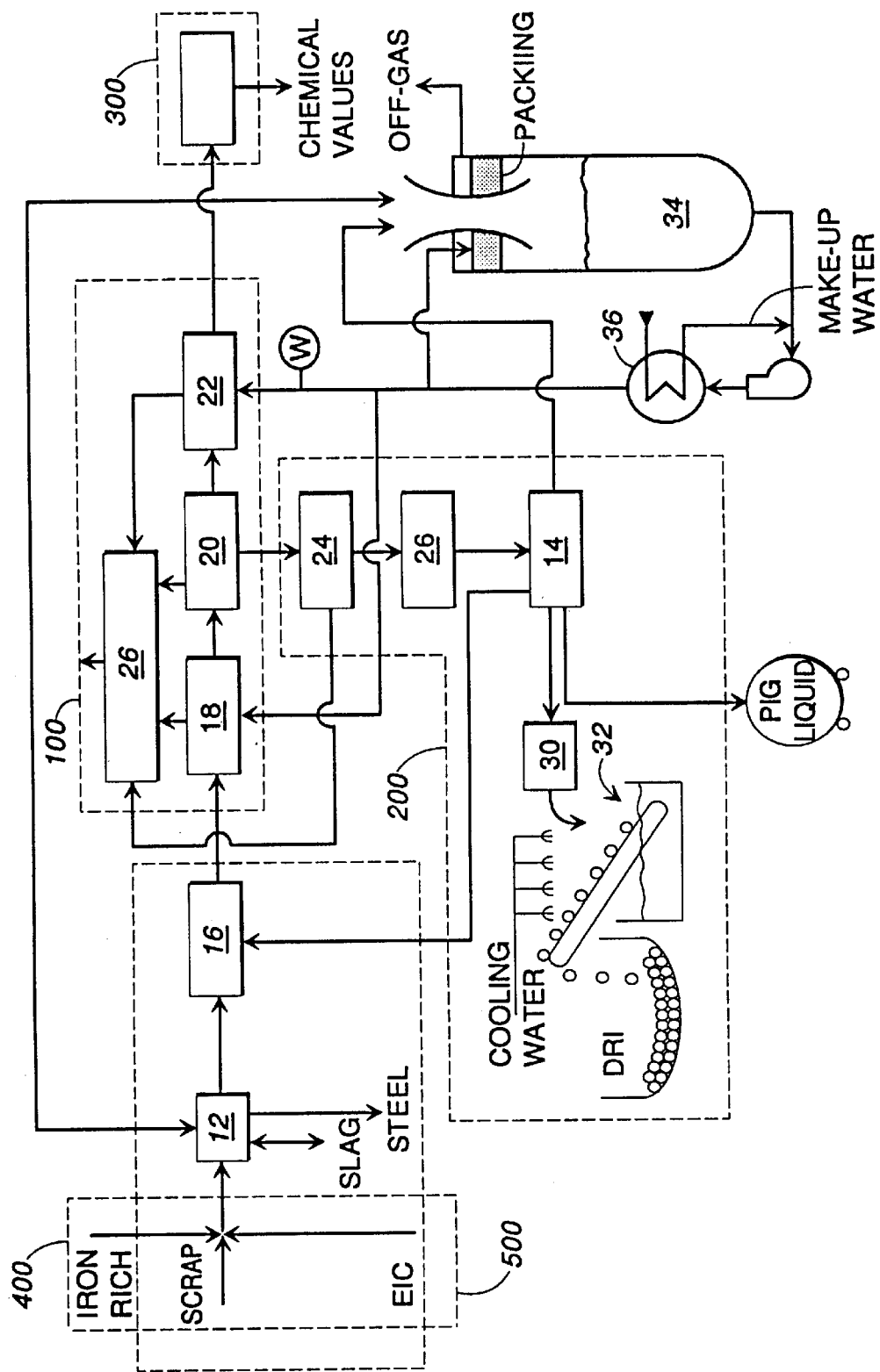
FIG. 2 is a schematic block diagram illustrating where the process of the present invention fits in in the overall recycle and recovery process for industrial waste streams.

Referring to FIG. 2, a preferred embodiment of the complete iron products and chemical values recycle and recovery process is shown. Subprocess 100, the digestion and filtration steps, generally comprises the process disclosed and claimed in parent application Ser. No. 08/238,250, which also is disclosed above. Subprocess 200, the direct reduced iron production steps, generally comprises the process disclosed and claimed in parent application Ser. No. 08/348,446, which also is disclosed above. The present process discloses an alternative to subprocess 200 in the preferred embodiments. Subprocess 300, the chemical values recovery steps, when combined with subprocess 100, generally comprises the process disclosed and claimed in parent application Ser. No. 08/302,179, which also is disclosed above. Subprocess 400, the enhanced direct reduced iron production steps, when combined with subprocess 200, generally comprises the process disclosed and claimed in parent application Ser. No. 08/360,394, which also is disclosed above.

Subprocess 500 comprises the feed process to the present invention. Feed streams such as iron poor waste fume streams from electric arc furnaces 12 and other furnaces such as reduction furnaces or smelters are filtered in a capture means 16, such as a baghouse or scrubber. Other feed streams such as iron rich direct reduced iron and pig iron, as well as scrap iron and steel, are subjected to the iron or steel making process. Exhaust fumes from such processes, which typically include an electric arc furnace or other reduction furnace, also are filtered in a capture means 16. The constituents filtered out in capture means 16 comprise the waste stream feed to subprocess 100. The present process discloses new subprocess 600 in the preferred embodiments as preliminary separation processes.

In subprocess 100, the waste stream feed is leached in digester 18 with ammonium chloride, preferably at approximately 90° C. and approximately 23% by weight concentration. Constituents soluble in ammonium chloride go into solution, while constituents insoluble in ammonium chloride, such as iron oxides, precipitate out. The precipitates are filtered from the solution in filter 20. The filtered solution is sent to cementer 22, and subjected to subprocess 300 to recover other chemical values. The precipitate, which is an iron cake (IC), is sent to subprocess 200.

In subprocess 200, the precipitate is dried and crushed in dryer/crusher 24. Exhaust gases from dryer/crusher 24 may be sent to a capture means 16 such as baghouse, but more typically are sent to an air scrubber such as air scrubber 26 for cleaning, as the exhaust gases from dryer/crusher 24 typically do not have a significant quantity of recoverable constituents. The dried and rushed precipitates are compacted in a compactor and sent to a reduction furnace or smelter 14. In reduction furnace 14B (see FIG. 1), the dried and crushed iron cake is roasted at between 980° C. and 1315° C., producing an enriched iron cake (EIC) which can comprise DRI. Pig iron, which can be in liquid form, can be produced in furnace 14A (see FIG. 1). The EIC can be compacted in a second compactor 30, and then cooled by cooling water in a cooling conveyor 32, to produce the DRI. The DRI then can be used as the feed to a steel mill EAF, and the process cycle starts over.

Exhaust fumes from the furnace 14 can be sent to scrubber 34, which preferably is a recirculating wet scrubber using water or an aqueous ammonium chloride solution. Exhaust fumes from EAFs such as EAF 12 also can be sent to scrubber 34. In scrubber 34, the exhaust fumes are scrubbed and the scrubbed off-gas released. The water or aqueous ammonium chloride solution containing the constituents scrubbed from the exhaust fumes is sent either to cementer 22 or digester 18, depending on purity; more pure solutions typically are sent to digester 18, while less pure solutions typically are sent to cementer 22.

In the preferred embodiment, the furnace 12, 14 off-gases comprise ZnO and other particulate impurities. If the off-gases are scrubbed in scrubber 34, the water balance is maintained using a temperature control such as heat exchanger 36. Additionally, the concentration of ZnO and other solubles in the scrubbing liquid may be controlled by the addition of water W to the cementer 22, or ammonium chloride to the scrubber 34. As discussed above, if an ammonium chloride solution is used as the scrubbing liquid, it is preferred to maintain the solution at approximately 90° C. and approximately 23% $NH_4Cl$.

Preroasting Process

The preroasting step, as mentioned above, can be carried out prior to the initial leaching step, or between a first and second leaching step, or both. The powder containing the franklinite and magnetite, such as the waste dust or the combination of waste dust and the iron oxide rich material, is heated to temperatures greater than 500° C. This temperature causes a reaction which causes a decomposition of the stable franklinite phase into zinc oxide and other components, and yet does not allow for the complete reduction of zinc oxide to zinc metal. The resulting zinc oxide can be removed by sublimation or extraction with an ammonium chloride solution, such as by following the steps detailed above under the general process. The resulting material after extraction has less than 1% by weight zinc.

The solid waste material can be preroasted using many conventional roasting processes, such as, for example, direct or indirect heating and the passing of hot gases through the dust. For example, non-explosive mixtures of reducing gases, such as hydrogen gas and nitrogen or carbon dioxide, can be passed through the powder containing franklinite and magnetite. Hydrogen gas is not the only species that may be used for reductive decomposition of franklinite. It is possible to use carbon or simple carbon containing species, including carbon-containing reducing gases and elemental carbon. Heterogeneous gas phase reductions are faster than solid state reductions at lower temperatures and therefore suggest the use of carbon monoxide. The carbon monoxide can be generated in situ by mixing the franklinite powder with carbon and heating in the presence of oxygen at elevated temperatures. The oxygen concentration is controlled to optimize CO production. The carbon monoxide may be introduced as a separate source to more clearly separate the rate of carbon monoxide preparation from the rate of Franklinite decomposition. The prepared zinc oxide then can be removed by either ammonium chloride extraction or sublimation.

The optional iron oxide rich material may be added to the process either before or after this preroasting step. As the preroasting step mainly is to assist in the decomposition of franklinite, if the iron oxide rich material is devoid of franklinite, it need not be subjected to preroasting.

Leaching Treatment

The waste material is subjected to an ammonium chloride leach. An ammonium chloride solution in water is prepared in known quantities and concentrations. If the two-stage leaching process is used, the feed material, such as the waste material flue dust described in Table I combined with any other feed material source which contains iron oxide, is added to the ammonium chloride solution. Otherwise, the feed material first is roasted. The majority of the waste material mixture, including any zinc and/or zinc oxide, lead oxide, cadmium oxide, and other metal oxides, dissolves in the ammonium chloride solution. The iron oxide does not dissolve in the ammonium chloride solution. As an example, the solubility of zinc oxide in ammonium chloride solutions is shown in Table II.

TABLE II

Solubility of ZnO in 23% NH₄Cl solution

| Temperature °C. | g Dissolved/100 g H₂O |
|---|---|
| 90 | 14.6 |
| 80 | 13.3 |
| 70 | 8.4 |
| 60 | 5.0 |
| 50 | 3.7 |
| 40 | 2.3 |

It has been found that a 23% by weight ammonium chloride solution in water at a temperature of at least 90° C. provides the best solubility for a waste stream comprising a significant quantity of zinc oxide. Concentrations of ammonium chloride below about 23% do not dissolve the maximum amount of zinc oxide from the waste material, and concentrations of ammonium chloride above about 23% tend to precipitate out ammonium chloride along with the zinc oxide when the solution is cooled. Therefore, 23% has been chosen as the preferred ammonium chloride solution concentration. The iron oxide and inert materials such as silicates will not dissolve in the preferred solution.

The zinc oxide, as well as smaller concentrations of lead or cadmium oxide, are removed from the waste material by the dissolution in the ammonium chloride solution. The solid remaining after this leaching step contains iron oxides and some impurities including zinc, lead, cadmium, and possibly some other impurities. The remaining solid then can be roasted in a reducing atmosphere, typically at a temperature greater than 420° C. and often at 700° C. to 900° C. The reducing atmosphere can be created by using hydrogen gas, simple carbon species gases such as carbon dioxide, or by heating the material in an oxygen containing gas in the presence of elemental carbon. The carbon preferably is in the form of dust or pellets. Typical preroasting times are from 30 minutes to 4 hours. As discussed above, the waste material first may be preroasted and second may be leached, omitting the first leaching step.

If the iron poor material is removed from the industrial waste stream using a wet scrubber, the preferred wet scrubber is an ammonium chloride solution wet scrubber. By using an ammonium chloride wet scrubber, the loaded scrubbing solution, ammonium chloride, can be combined directly with the ammonium chloride leachant, or sent directly to the cementation step for removal of certain non-iron products. Alternatively, the loaded ammonium chloride scrubbing solution may act as the primary leachant in Basic Process Step b. Depending on the degree of loadedness of the ammonium chloride scrubbing solution, pure make-up ammonium chloride solution can be added to increase the effectiveness of the ammonium chloride leachant.

As another alternate embodiment, iron-poor waste streams in both solid and liquid form may be added to the present process for treatment. The solid stream may be added to Basic Process Step a, while the liquid stream may be added to Basic Process Step b.

Optional Carbon Addition Step

The present process also can be operated to produce a high-quality iron-carbon cake as a residual product. The iron oxide contained in the waste stream does not go into solution in the ammonium chloride solution, but is filtered from the product solution as undissolved material. This iron oxide cake can be used as is as the feedstock to a steel mill; however, as previously discussed, it becomes more valuable if reduced by reaction with elemental carbon to produce an iron-carbon or direct-reduced iron product. One preferred method for producing such an iron-carbon or direct-reduced iron product from the waste material comprises the steps of:

a. treating the waste material combination with an ammonium chloride solution at an elevated temperature to form a product solution which comprises dissolved zinc and dissolved zinc oxide whereby any iron oxide in the waste material will not go into solution;

b. adding carbon to the product solution whereby the carbon will not go into solution; and then c. separating the product solution from the undissolved materials present in the product solution including any of the iron oxide and the carbon.

A mixture of iron oxide and carbon is used by the steel industry as a feedstock for electric arc furnaces. The iron oxide cake which is removed as undissolved material from the leaching step is primarily iron oxide, being a mixture of $Fe_2O_3$ and $Fe_3O_4$. The iron oxide cake can be made into the mixture of iron oxide and carbon by adding elemental carbon to the iron oxide cake in several manners. First, carbon can be added to the leaching tank at the end of the leaching step but before the undissolved materials are separated from the product solution. Since the carbon is not soluble in the ammonium chloride solution and will not react in an aqueous solution, the iron oxide cake and the carbon can be separated from the product solution and made into a hard cake. Different size carbon, such as dust, granules, or pellets, may be used depending on the desires of the steel makers. Second, the carbon can be added to the iron oxide after the iron oxide has been separated from the product solution. The dried iron oxide and the carbon can be ribbon blended in a separate process.

Combining carbon and iron oxide in a reducing atmosphere and at an elevated temperature results in the reduction of the iron oxide, producing DRI. When carbon-enriched iron oxide is melted, it forms a desired foamy slag because it contains both carbon and iron oxide. Because the price of steel scrap usually is lower than DRI, the use of DRI usually cannot be economically justified. DRI typically runs in the $120.00 and higher per ton range. However, since the iron oxide is a residual product of an economical recovery process, such as the recovery of zinc oxide from flue dust described generally below, with the main value of the process being from the zinc oxide product, the iron oxide or direct-reduced iron can be produced more economically. Therefore, the iron oxide produced as a residual in this process has significant value.

Generally the iron oxide and carbon product is pressed into a cake for ease of handling and use. The cake typically contains approximately 82% solids, but may range from 78% to 86% solids and be easily handled and used. Although cakes of less than 78% solids can be formed, the other 22%+of material would be product solution which, if the cake is used as a feedstock to a steel mill, would be reintroduced to the steel-making process, which is uneconomical. Likewise, drying the cake to have more than 86% solids can be uneconomical.

The roasting process produces vapors, from the zinc, lead and cadmium and other impurities, that have to be condensed into dust. These impurities can be sent to the baghouse at the end of the steel making process, mixed into the original waste dust, and then sent to the first leaching step, in a recycle fashion. Alternatively, the exhaust vapors and dust from the roasting step may be sent to a separate baghouse at a stand alone facility.

There are two preferred ways to add carbon to the iron oxide cake. First, it may be beneficial when the iron oxide cake comes out of the reclamation process to grind up the iron oxide cake, pelletize it with carbon and put it in a roasting furnace. Second, carbon can be added to the furnace with the iron oxide.

The iron oxide cake can be treated in three manners. First, carbon can be added to the leaching step and the iron oxide cake will have carbon plus iron oxide. The iron oxide-carbon cake can go directly to the steel mill and, if it goes directly to the steel mill, then the reduction of the iron oxide would take place in the steel mill furnace. Second, the iron oxide-carbon cake can be pelletized and roasted in a reduction furnace to form direct reduced iron. The iron oxide precipitate, which typically contains around 80% solids, is ground up with carbon and formed into pellets, briquettes or cubes and then heated. These pellets, briquettes or cubes then can be introduced to a steel making furnace. The difference in the material that would be introduced to the furnace from the first manner and the second manner is that in the second manner, direct reduced iron is introduced to the steel making furnace, while in the first manner, a combination of iron oxide and carbon is introduced to the steel making furnace. The iron oxide plus carbon can be supplied to the steel mill as is. When this carbon enriched iron oxide is melted, it forms a foamy slag, and a foamy slag is desirable in steel making. Third, the carbon can be added through a ribbon blender, and then the iron oxide-carbon cake can be introduced either directly into the furnace or, preferably roasted in a reduction furnace first to form direct reduced iron, which would be preferred for steel making.

In order of preference, the first manner is the least preferable, that is adding the material itself as a mixture of carbon and iron oxide without any reducing agents mixed in with it. The second most preferable is the third manner, adding the material with carbon added to it either through the leaching step or through a ribbon blender and put directly into the furnace. The most preferable is the second manner, where carbon is added either though the leaching step or a ribbon blender, pelletizing or briquetting it, roasting it, and introducing it to the steel furnace.

In any manner, the fumes exhausting from the steel mill furnace and the reduction furnace typically are iron poor, but comprise other valuable components. The furnace exhaust fumes are an excellent source of iron poor waste materials useful for recovery in the present process. The exhaust fumes may be filtered in a baghouse, with the resulting filtrate being added to the waste stream feed of the present process, or with the resulting filtrate being the primary waste stream feed of the present process. The exhaust fumes also may be scrubbed in a wet scrubber, with the resulting loaded scrubbing solution being added to the ammonium chloride leachant of the present process. If an ammonium chloride scrubbing solution is used instead of water, the loaded ammonium chloride scrubbing solution may be used as the primary leachant of the present process.

EXAMPLES

The following Examples are taken from data demonstrating ways to increase the formation of zinc oxide from the product solution produced according to the present invention. The Examples are intended to illustrate the initial treatment of the waste material stream, including the leaching treatment and the initial waste material stream roasting, if employed.

Example 1

Prior Art

A metal dust of composition listed in Table I of the Burrows patent is added to 23% by weight $NH_4Cl$ solution (30 g $NH_4Cl$ per 100 g $H_2O$), as discussed in the Burrows patent, in the amount of 1 gram of dust per 10 grams of solution. The solution is heated to a temperature of 90° C. and stirred for a period of 1 hour, during which the zinc oxide in the dust dissolves. The remaining solid, which has a composition of approximately 60% iron oxide, 5% calcium oxide, 5% manganese, 30% other materials, is filtered out of the solution. This remaining solid is further treated according to the invention to recover feedstock grade direct reduced iron or iron oxide.

Example 2

A metal dust of composition listed in Table I is added to 23% weight $NH_4Cl$ solution (30 g $NH_4Cl$ per 100 g $H_2O$). 1 gram of dust is used per 10 grams of solution. The solution is heated to a temperature of 90° C. and stirred for a period of 1 hour. During this period the zinc oxide in the dust dissolves. The remaining solid, having a composition of approximately 60% iron oxide, 5% calcium oxide, 5% manganese, 30% other materials, is filtered out of the solution. This remaining solid is further treated according to the invention to recover feedstock grade direct reduced iron or iron oxide.

Example 3

A dust containing 19.63% Zn, 27.75% Fe, 1.31% Pb, 9.99% Ca, and 0.024% Cd (analysis based on elements not oxides) was leached at 100° C. in a 23% ammonium chloride solution. The solid remaining after the leaching process was dried and analyzed to contain 12.67% Zn, 4.6% Ca, 35.23% Fe, 0.7% Pb, and 0.01% Cd. This material was placed in a quartz boat in the presence of activated carbon and heated at 900° C. for two hours in an atmosphere of 95% $N_2$ and 5% $O_2$. After two hours, the material was removed and added to a 23% ammonium chloride solution at 100° C. The material was filtered and dried at 140° C. for one hour to determine its composition. Analysis of this remaining solid was 42.84% Fe, 0.28% Zn, <0.1% Pb, and <0.01% Cd. This remaining solid is further treated according to the invention to recover feedstock grade direct reduced iron or iron oxide.

Example 4

A dust with the composition given in Table I is leached in 23% ammonium chloride solution for 1 hour at 100° C. The solid remaining (which contained 14% Zn) was placed in a quartz boat and heated to 700° C. in an atmosphere of 8% $H_2$ and 92% Ar. The material was cooled and reheated at 100° C. in 23% ammonium chloride solution at 100° C. The solid was separated, dried and analyzed for zinc. The zinc was found to be less than 1%. The leached-roasted-leached material then can be subjected to the remainder of the general process.

Optional Recovery of Zinc Oxide From Product Solution

To recover the zinc oxide from the product solution in subprocess 300, while the filtered zinc oxide and ammonium chloride solution is still at a temperature of 90° C. or above, finely powdered zinc metal is added to the solution. Through an electrochemical reaction, any lead metal and cadmium in solution plates out onto the surfaces of the zinc metal particles. The addition of sufficient powdered zinc metal results in the removal of virtually all of the lead of the solution. The solution then is filtered to remove the solid lead, zinc and cadmium.

Powdered zinc metal alone may be added to the zinc oxide and ammonium chloride solution in order to remove the solid lead and cadmium. However, the zinc powder typically aggregates to form large clumps in the solution which sink to the bottom of the vessel. Rapid agitation typically will not prevent this aggregation from occurring. To keep the zinc powder suspended in the zinc oxide and ammonium chloride solution, any one of a number of water soluble polymers which act as antiflocculants or dispersants may be used. In addition, a number of surface active materials also will act to keep the zinc powder suspended, as will many compounds used in scale control. These materials only need be present in concentrations of 10–1000 ppm. Various suitable materials include water soluble polymer dispersants, scale controllers, and surfactants, such as lignosulfonates, polyphosphates, polyacrylates, polymethacrylates, maleic anhydride copolymers, polymaleic anhydride, phosphate esters and phosponates. Flocon 100 and other members of the Flocon series of maleic-based acrylic oligomers of various molecular weights of water soluble polymers, produced by FMC Corporation, also are effective. Adding the dispersants to a very high ionic strength solution containing a wide variety of ionic species is anathema to standard practice as dispersants often are not soluble in such high ionic strength solutions.

At this stage there is a filtrate rich in zinc compounds and a precipitate of lead, cadmium and other products. The filtrate and precipitate are separated, with the precipitate being further treated, if desired, to capture chemical values. The filtrate may be treated in several manners, two of which are preferred. First, the filtrate may be cooled resulting in the crystallization and recovery of zinc oxide. Second, the filtrate may be subjected to electrolysis resulting in the generation and recovery of metallic zinc.

To recover zinc oxide, the filtrate then is cooled to a temperature of between about 20° C. and 60° C. resulting in the crystallization of a mixture of zinc compounds. The mixture contains a significant amount of diamino zinc dichloride, or other complex compounds which involves zinc amino complexes, hydrated zinc oxides and hydroxide species. Crystallization helps to achieve a high purity zinc oxide of controlled particle size, typically through control of the temperature-time cooling profile. Reverse natural cooling, that is cooling the solution slower at the beginning of the cooling period and faster at the end of the cooling period, is preferred to control the nucleation to crystal growth ratio and, ultimately, the crystal size distribution. The precipitated crystallized solid is filtered from the solution and washed with water at a temperature of between about 25° C. and 100° C. The filtered solution is recycled for further charging with feed material. The diamino zinc dichloride dissolves in water. The solubility of diamino zinc dichloride in water is shown in Table III.

TABLE III

Solubility of $Zn(NH_3)_2Cl_2$ in water

| Temperature °C. | g Dissolved/100 g $H_2O$ |
|---|---|
| 90 | 32 |
| 80 | 24 |
| 40 | 21 |
| 25 | 12.8 |

Very little of the hydrated zinc oxide dissolves in the water. This resultant solution then is filtered to remove the hydrated zinc oxide species. The solid hydrated zinc oxide species filtered from the solution is placed in a drying oven at a temperature of over 100° C. After a sufficient drying period, the resultant dry white powder is essentially pure zinc oxide. The filtrate from the solution is recycled for charging with additional zinc compound mixture.

The zinc oxide may be dried at approximately 100° C. To ensure that the material is free of chloride, however, it is preferable to heat the zinc oxide to a higher temperature. Diamino zinc dichloride decomposes at 271° C. and ammonium chloride sublimes at 340° C. Therefore, heating the zinc oxide to a temperature above 271° C. is useful. The drying temperature should be kept below approximately 350° C. to prevent the sublimation of significant amount of ammonium chloride. Therefore, it is preferable to dry the zinc oxide at a temperature in the range of 271° C. to 350° C. Typically, the zinc oxide should be dried in this temperature range for approximately 2 to 60 minutes, and preferably from 5 to 20 minutes. A 10 minute drying time has been found to be a satisfactory average.

As the zinc, lead and cadmium contained in the feed materials are amphoteric species, by using ammonium chloride solution these species will go into solution, while any iron oxide present in the feed material will not go into solution. Other solutions, such as strong basic solutions having a pH greater than about 10 or strong acidic solutions having a pH less than about 3, also can be used to dissolve the zinc, lead and cadmium species; however, if strong acidic solutions are used, iron oxide will dissolve into the solution, and if strong basic solutions are used, iron oxide will become gelatinous. The lead and cadmium can be removed from the ammonium chloride solution through an electrochemical reaction which results in the precipitation of lead and cadmium in elemental form. The difference in solubility between diamino zinc dichloride and zinc oxide in water and in ammonium chloride solutions allows the selective dissolution of the diamino zinc dichloride such that pure zinc oxide can be recovered. This also can be used in the crystallization step to improve the relative amounts of diamino zinc dichloride and zinc oxide species form. Significantly, all of the zinc can be recycled so that all of the zinc eventually will be converted into zinc oxide.

The crystallization step of the present process can be done continuously in order to increase the throughput and maximize the zinc oxide yield after the washing and drying step. The purpose of the crystallization/washing step is to produce a high purity zinc oxide of controlled particle size. This is accomplished through control of the temperature-time profile during cooling in the crystallization.

The crystallization step in the process takes the filtrate from the cementation step at 90°–100° C. This filtrate contains the dissolved zinc with small amounts of trace impurities such as lead and cadmium. In order to prepare a pure zinc oxide it is necessary to prevent the formation of solvent inclusions inside the grown crystals. Solvent inclusions are pockets of liquid trapped as a second phase inside the crystals. Control of crystallization conditions can be employed to reduce these impurities. An example is given below.

Example 5

A dust of the composition given in Table I is taken through the leaching and cementation steps. After cementation the filtrate is maintained at 100° C. 500 ml of this filtrate is placed in a jacketed stirred vessel with the jacket temperature at 100° C. The temperature is lowered in the crystallizer as follows:

| Time (minutes) | Temperature (°C.) |
| --- | --- |
| 0 | 100 |
| 60 | 90 |
| 120 | 75 |
| 180 | 55 |
| 210 | 25 |

The resulting solid was washed and dried employing the procedure described above. The resulting material was analyzed as follows:

| | |
| --- | --- |
| ZnO | 99+% |
| Lead | <50 ppm |
| Cd | <25 ppm |
| Fe | <25 ppm |

The cooling profile in Example 6 is known as a reverse natural cooling profile. Such a profile is the opposite shape as that which is observed by natural cooling. In a reverse natural cooling profile, the cooling is slower at the beginning and faster at the end; in a natural cooling profile, the cooling is faster at the beginning and slower at the end. This type of cooling profile also is used to control the crystal size distribution (CSD) of the zinc oxide obtained. The cooling profile controls the ratio of nucleation (birth of a new crystal) to crystal growth (growth of existing crystals). The ratio of nucleation/growth determines the final CSD.

Example 6

A 23% ammonium chloride solution at 100° C. containing 11% by weight dissolved ZnO is divided into 4 portions. Each portion is placed in a jacketed agitated vessel. The cooling profiles in each vessel are given below:

| Vessel A | | Vessel B | |
| --- | --- | --- | --- |
| Time (minutes) | Temp. (°C.) | Time (minutes) | Temp. (°C.) |
| 0 | 100 | 0 | 100 |
| 60 | 75 | 60 | 50 |
| 120 | 50 | 120 | 37.5 |

| Vessel C | | Vessel D | |
| --- | --- | --- | --- |
| Time (minutes) | Temp. (°C.) | Time (minutes) | Temp. (°C.) |
| 0 | 100 | 0 | 100 |
| 60 | 87.5 | 60 | 87.5 |
| 120 | 75 | 120 | 75 |
| 180 | 25 | 180 | 62.5 |
| | | 270 | 25 |

The solid is washed using the usual procedures described previously. The average size and size distribution of these materials were measured using a laser light scattering particle size analyzer. The results were as shown below:

| Vessel | Mean Size |
| --- | --- |
| A | 22 |
| B | 19 |
| C | 27 |
| D | 37 |

The results show that controlling the temperature with a reverse natural cooling curve results in a larger average size than by linear cooling (A) or natural cooling (B). This principle can be employed to design cooling profiles to produce zinc oxides of a desired average size and distribution.

Optional Preroasting Step for Enhanced Zinc Recovery

The zinc dust obtained from various sources have shown by chemical analysis to contain from 20%–25% zinc by weight. X-ray diffraction indicates clearly the existence of certain crystalline phases in this dust, specifically zinc oxide. The positive identification of the iron phase is complicated by the possible structural types (i.e. spinel type iron phases showing almost identical diffraction patterns). The zinc oxide (as well as smaller concentrations of lead or cadmium oxide) are removed from the initial dust by dissolution in a concentrated ammonium chloride solution (23% ammonium chloride).

Filtration and washing of the undissolved species leaves a residual powder. This powder shows a zinc concentration that is still elevated (i.e., 10–13% by weight), but that is not zinc oxide. X-ray diffraction indicates that all crystalline phases can be identified by spinel type phases. The combination of chemical analysis and x-ray diffraction indicates that this powder is a combination of magnetite (iron oxide: $Fe_3O_4$). Both of these phases have very similar spinel type structures. The zinc within the franklinite, (Fe, Mn, Zn)$(FeMn)_2O_4$, cannot be removed by dissolution with ammonium chloride. In addition, no simple extraction process will remove zinc from this stable oxide phase. Although this compound is very stable to oxidation (all elements in the highest oxidation state), it is relatively easy to destroy this compound by reduction at elevated temperatures. The reduction of the franklinite in an atmosphere that cannot readily reduce zinc oxide or allow for the rapid oxidation of zinc to zinc oxide following reduction and subsequently recover the zinc oxide by ammonium chloride extraction or sublimation (the highly volatile zinc oxide will sublime from the mixture at relatively low temperatures and recondense at the cold locations of the roaster). The alternative will be complete reduction of the franklinite to zinc metal and removal by distillation or separation of the molten zinc by settling techniques. This can be accomplished by including the preroasting step disclosed above.

Recycle

To produce pure zinc oxide from waste dust containing zinc efficiently and in a safe and cost effective way, the process recycles all zinc which is not removed from the leachate in the crystallization step. In addition, the diamino zinc dichloride which is redissolved in water in the washing step also is recycled. The recycle of zinc increases the overall zinc concentration in liquid solution in the process. This allows the crystallizer to operate at a higher temperature due to the rapid change in zinc oxide solubility with temperature in ammonium chloride solution. An example of the process with recycle is given below:

Example 7

By controlling the recycle, the steady state zinc concentration can be raised to 7 g/100 g of solution. If the outlet of the crystallizer is kept at 60° C., 3 g/100 g solution of solid will crystallize (the solid is a mixture of zinc oxide and diamino zinc dichloride). The system does not have to be cooled further since this is an efficient way to operate to conserve energy (one does not have to cool then reheat the solution). In addition, operating at the higher Zn concentration improves the ratio of ZnO/diamino zinc dichloride produced in the crystallizer.

The recycle has the advantage that the solution become saturated relative to certain materials present in the dust, such as CaO. When this occurs, CaO no longer is leached from the dust but remains with the iron in the iron cake. This increases the value of the cake since CaO is still present and will not have to be added when the iron cake is fed to a furnace in steel making. Another important advantage in that there is no liquid effluent in this process. The only products are solid (iron cake, zinc oxide, waste metals), which are then sold for use in various industrial processes. No waste is produced since all liquid is recycled.

Iron By-Product Recycle

Iron-rich by-products produced during the recovery process can be processed further to obtain an end product which can be recycled back into the leaching step of the recovery process of the present invention. The iron-rich by-products preferably are reduced to DRI in a reduction furnace. During the reduction process, exhausts fumes which consists primarily of zinc, lead and cadmium are produced in the reduction furnace.

In accordance with a first embodiment, the DRI is sent to a steel mill where it is used in the production of steel. The steel production process results in exhaust fumes which are processed through the baghouse or/and a wet scrubber, either or both of which can be located at the steel mill. Fumes processed through the baghouse are filtered, and the captured solid residuum, along with an added amount of EAF dust, is recycled back into the waste materials stream whereby it is returned to the leaching step of the recovery process. Fumes processed through the wet scrubber are scrubbed in a liquid stream and the residual impurities obtained from the scrubbing process are discharged from the wet scrubber directly into the ammonium chloride solution of the leaching step.

In accordance with a second embodiment, the fumes exhausted from the reduction furnace used to produce the DRI are processed through the baghouse or/and the wet scrubber. Fumes processed through the baghouse are filtered, and the captured solid residuum is recycled back into the waste material stream, whereby it is returned to the ammonium chloride solution of the leaching step. In this embodiment, no EAF dust need be added in with the solid residuum. Fumes processed through the wet scrubber are scrubbed in a liquid stream and the residual impurities obtained from the filtering process are discharged from the wet scrubber directly into the ammonium chloride solution of the leaching step.

Therefore, iron-rich products which are produced during the recovery process of the present invention can be further processed to produce fumes consisting primarily of zinc, lead and cadmium which are captured in a baghouse or/and a wet scrubber and recycled back into the ammonium chloride solution of the leaching step to be used in the recovery process.

It should be noted that the locations of the baghouse and wet scrubber are a matter of design choice, plant efficiency and convenience. The present invention is not limited in this aspect. For example, steel mills are equipped with baghouses and wet scrubbers which can be used in the recycling process of the present invention. Similarly, the locations of the baghouse or wet scrubber used to process fumes from the DRI reduction furnace are also a matter of design choice, plant efficiency and convenience.

d. Further Sodium Hydroxide Leach

Once the essentially pure zinc oxide has been recovered, as discussed above, a further zinc oxide purification process is utilized which, in a preferred embodiment, is based on the solubility of zinc oxide in a concentrated sodium hydroxide solution. The solubility of zinc oxide in sodium hydroxide increases significantly with increasing sodium hydroxide concentration. For example, a 16 molar sodium hydroxide solution (640 g per liter) will dissolve 4 mole (320 g) of zinc oxide. If this solution is then diluted by a factor of 4, the solubility will decline so that approximately 180 g of zinc oxide/zinc hydroxide will precipitate. In accordance with the preferred embodiment, the zinc oxide purification process utilizes this phenomenon to produce zinc oxide which is at least 99.8% pure.

In the first step of the preferred process, zinc oxide is dissolved in a 50%–70% sodium hydroxide solution. Since most metals are not soluble in concentrated sodium hydroxide, most of the metal impurities in the zinc oxide will not dissolve, including manganese, iron and cadmium. Lead and calcium are soluble in concentrated sodium hydroxide and therefore will dissolve, as will chloride. The solution is then filtered to remove the undissolved materials which are then sent to the metals recovery section of the plant.

The solution is then diluted with water by a factor ranging from 3 to 30, but preferably 3 to 8, and optimally around 4, which appears to be optimum from the point of view of product recovery and energy costs. The best mode for the dilution step is performed hot at a temperature at or above 70° C. and preferably at temperatures ranging from 80° to 100° C. at atmospheric pressure. Temperatures below 70°C., and temperatures above 100° C. at pressures greater than atmospheric, may be used, but are not as economically as advantageous as in the preferred range. The hot temperatures cause the formation of zinc oxide to be favored over the formation of zinc hydroxide. The resulting zinc oxide crystals which form are then filtered out, sent to a wash tank where they are washed with water, and then sent to a dryer where they are dried, preferably at a temperature of 160° C.

The diluted sodium hydroxide solution is then sent to an evaporator condenser where the solution is concentrated back to 50%–70% sodium hydroxide and then reused. When a steady state has been achieved, this step results in the formation of sodium chloride crystal which will be filtered out of the solution and recovered. This is because sodium chloride formed by the chloride present in the zinc oxide is less soluble in concentrated sodium hydroxide solution than in dilute sodium hydroxide. After the sodium chloride is filtered out, the concentrated solution can be reused in the purification process. Periodically, lead will be removed from the sodium hydroxide solution by cementation. This involves the addition of zinc dust which will displace the lead in solution. The lead will then be filtered out and sent to the lead recovery portion of the plant.

By controlling the rate of dilution of the sodium hydroxide solution or its method of addition during the zinc oxide crystallization step, it is possible to control the particle size hence the surface area of the zinc oxide produced. Furthermore, it should be observed that the zinc oxide purification process is not limited to the purification of zinc oxide recovered by the zinc oxide recovery process of the present invention and can be used to purify zinc oxide provided from any source.

Additionally, by selecting the method of addition of the intermediate solution, preferably sodium hydroxide, during the zinc oxide crystallization step, it is possible to control the particle size hence the surface area of the zinc oxide produced. It has been found that the smaller the droplet size in which the solution is added, the smaller the particle size (larger surface area). By dispersing the sodium hydroxide into droplets by a hydraulic atomizer, the particle size can be controlled. Additionally, at a constant droplet size, vigorous mixing will result in a larger surface area. The principle can be employed through selection of the appropriate droplet size and amount of mixing, to obtain highly purified zinc oxide with a predetermined surface area. This general relationship is shown in Table IV.

TABLE IV

| Approximate Droplet Size | Approximate Surface Area |
|---|---|
| 250 microns | 2.0 $m^2/g$ |
| 180 microns | 3.0 $m^2/g$ |
| 150 microns | 4.0 $m^2/g$ |
| 100 microns | 10.0 $m^2/g$ |

As the concentration of the sodium hydroxide increases, the number of moles of zinc oxide which can be dissolved in the sodium hydroxide solution increases. As the sodium hydroxide solution is diluted, the number of moles which can be dissolved in the solution decreases, i.e., the zinc oxide in the solution begins to precipitate. This solubility characteristic of zinc oxide in sodium hydroxide is used by the present invention to purify zinc oxide by first dissolving the zinc oxide in a highly concentrated solution of sodium hydroxide and filtering out the impurities which do not dissolve, and then by diluting the sodium hydroxide solution to cause the zinc oxide to precipitate. By controlling the rate of dilution, the particle size and surface area of the zinc oxide produced can be controlled.

A hold tank maintains a 50%–70% NaOH solution at 120° C. to 150° C. The zinc oxide-containing product to be purified is dissolved in the concentrated NaOH solution in a digestion tank, which solution is delivered to the digestion tank from the hold tank. The undissolved impurities are filtered out in a tramp press and the concentrated solution containing the zinc oxide is delivered to a precipitation tank. The solution contained in the precipitation tank then is diluted at a predetermined rate with distilled water. As discussed above, preferably the dilution takes place at a temperature ranging from 70° C. to 100° C., and preferably from 80° C. to 100° C., so that the formation of zinc oxide as opposed to zinc hydroxide is favored. The zinc oxide crystal precipitates due to the decreasing solubility of zinc oxide as the NaOH solution is diluted. The zinc oxide crystal is then filtered and washed with water in a press. The zinc oxide crystal is then dried, preferably at approximately 160° C., in a drier.

The diluted solution, after the zinc oxide crystal has been filtered out, is collected in a feed tank from which it is delivered to an evaporator condenser which concentrates the solution back to 50%–70%. When steady state is achieved, sodium chloride crystals will form which are filtered out in a press as the re-concentrated NaOH solution is delivered back to the hold tank for reuse in the purification process. Periodically, lead will be removed from the NaOH solution by cementation by adding zinc dust which displaces the lead in solution. The lead will be filtered out and sent to the lead recovery portion of the plant. The purified zinc oxide can be ground, sized and bagged 26.

The following examples illustrate how the purification process in accordance with the preferred embodiment results in a zinc oxide product which is at least 99.8% pure.

Example 8

48 grams of NaOH are dissolved in 52 grams of distilled water making a 12 molar solution. 21 grams of zinc oxide is added making a saturated solution. The excess zinc oxide along with any insoluble impurities is filtered out. The zinc oxide used was obtained from the recovery process of the present invention and was approximately 1% chloride, 700 ppm manganese, 150 ppm iron, and 300 ppm lead.

The solution was then added to a volume of boiling water resulting in a dilution of 30 times. After boiling for a few minutes zinc oxide crystals appeared. These crystals were filtered, dried and washed. They were then heated for one hour at 160° C. The resulting zinc oxide was a fine white powder with a surface area of 7.3 $m^2/g$ as measured by the BET method. Analysis of the zinc oxide showed no detectable iron or manganese using DCP analysis. Lead was present at 160 ppm and chloride was under 50 ppm. The material contained 99.8% or greater zinc oxide.

Example 9

The same solution as used in Example 8 was prepared. The solution was added to a volume of boiling water resulting in a dilution by a factor of six. Zinc oxide crystals appeared rapidly. These crystals were filtered, washed, dried and then heated for one hour at 160° C. The resulting zinc oxide was a fine white powder with no detectable iron or manganese and a chloride content of less then 50 ppm. The material contained 99.8% or greater zinc oxide.

Example 10

The solution used in Example 8 was prepared and placed in a one liter vessel and kept at 90° C. Water at 90° C. was added slowly over a period of one hour until the solution was diluted by a factor of five. The resulting zinc oxide was filtered out and dried for one hour at 160° C. It was a fine white powder with no detectable iron or manganese and a chloride content of less then 50 ppm. The material contained 99.8% or more zinc oxide.

The type of intermediate used in the zinc oxide purification process will depend on the desired purity and particle characteristics to be obtained. For example, it has been determined that if ammonium sulfate is used as the intermediate instead of sodium hydroxide, the desired particle size of the purified zinc oxide can be obtained by controlling the cooling of the ammonium sulfate solution to precipitate zinc hydroxide, because the solubility of zinc oxide in ammonium sulfate is temperature dependent. The following example illustrates how this embodiment can be used to purify zinc oxide while obtaining desirable size and shape characteristics.

Example 11

A saturated, boiling solution of 100 gm of ammonium sulfate in 100 g of water was prepared. Zinc oxide prepared from EAF dust by the ammonium chloride recovery process discussed above which contains 4% chloride ion was added to the solution. The saturated solution was filtered, maintaining the temperature above 95° C. The level of chloride in this zinc oxide affects the quantity dissolved in the ammonium sulfate. On cooling to 60° C. over 20 minutes zinc hydroxide was precipitated, filtered and washed. After heating to 150° C., 6 gm of zinc oxide having a surface area of 8 square meters per gram was obtained. The product has a considerably reduced level of chloride ion (below 0.01%) and also a lower lead content.

Intermediates other than sodium hydroxide and ammonium sulfate can also be used to precipitate zinc oxide having the desired purity and particle characteristics. The following intermediates are chosen in accordance with the desired purity and particle characteristics to be obtained: ammonium chloride liquor, ammonium phosphate, potassium hydroxide, ammonia/ammonium oxalate and ammonia/ammonium carbonate solutions.

Example 12

21 g zinc oxide containing 2% chloride, 200 ppm lead, 100 ppm manganese, 50 ppm iron are added to 100 ml of sodium hydroxide solution (50% by weight) at 100° C. The solution was filtered to remove any insoluble materials and then added to 300 ml of water at 100° C. The solution is stirred and the resulting zinc oxide is filtered washed and dried. The zinc oxide obtained has no measurable lead, manganese or iron present and has under 50 ppm chloride. The surface area is 1.8 $m^2/g$.

This experiment was then repeated with the sodium hydroxide solution being dispersed into droplets by a hydraulic atomizer. The average droplet size of the solution was 180 microns. The resulting zinc oxide had a surface area of 3.0 $m^2/g$. The composition was the same.

ALTERNATIVE METHODS OF PRODUCING IRON FEEDSTOCKS

Two alternative methods of producing iron feedstocks using the purification method can be included in the present process. These are the bases for subprocess 400.

First is a method for the production of a feedstock which comprises usable iron constituents and a purified zinc oxide product from industrial waste streams, comprising the steps of combining a first waste material stream which is iron poor and comprises non-iron constituents with a second waste material stream which comprises iron and non-iron constituents to produce a waste material combination, wherein at least one of said waste streams comprises zinc oxide; roasting the waste material combination at an elevated temperature of at least 500° C. in a reducing atmosphere prior to treating the waste material combination with an ammonium chloride solution; treating the waste material combination with a sodium hydroxide solution to form a product solution which comprises dissolved non-iron constituents and an undissolved precipitate, whereby any non-leachable metals and metal compounds in the waste material combination will be contained in the undissolved precipitate and will not go into solution; separating the product solution from the undissolved precipitate; roasting the undissolved precipitate at an elevated temperature to reduce any iron oxide in the waste material combination into direct reduced iron, resulting in the production of a feedstock which comprises usable iron constituents; diluting the product solution at a predetermined rate by a factor ranging from 3 to 30 at a temperature ranging from 70° C. to 100° C. to precipitate zinc oxide crystals; filtering out the zinc oxide crystals and washing the zinc oxide crystals in water; and drying the zinc oxide crystals.

Second is a method for the production of a feedstock which comprises usable iron constituents and a purified zinc oxide product from one or more industrial waste streams, at least one of which comprises zinc oxide, comprising the steps of scrubbing a first waste material stream which is iron poor and comprises non-iron constituents; combining the scrubbant and a second waste material stream which comprises iron and non-iron constituents with a sodium hydroxide solution to form a product solution which comprises dissolved non-iron constituents and an undissolved precipitate, whereby any non-leachable metals in the waste material combination will be contained in the undissolved precipitate and will not go into solution; separating the product solution from the undissolved precipitate; roasting the undissolved precipitate at an elevated temperature to reduce any iron oxide in the waste material combination into direct reduced iron, resulting in the production of a feedstock which comprises usable iron constituents; diluting the product solution at a predetermined rate by a factor ranging from 3 to 30 at a temperature ranging from 70° C. to 100° C. to precipitate zinc oxide crystals; filtering out the zinc oxide crystals and washing the zinc oxide crystals in water; and drying the zinc oxide crystals.

PRODUCTION OF ZINC COMPOUNDS FROM ZINC OXIDE

The zinc oxide produced by this process can be used to make a number of other zinc compounds. This is the bases for subprocess 300. Those include, zinc acetate, zinc borate, zinc bromate, zinc carbonate, zinc chloride, zinc chromate, zinc hydroxide, zinc nitrate, zinc phosphate, zinc stearate, zinc gluconate, zinc sulfate, and zinc EDTA salt. This list is not exhaustive and many other zinc compounds can be made by adding the appropriate reactants to the zinc oxide slurry.

Commercial zinc oxide is usually made by combustion of zinc vapor in air and is collected as a dry powder. The zinc oxide prepared as described herein is a precipitate in aqueous solution. This allows a range of downstream chemicals to be manufactured by addition of the appropriate acid to the zinc oxide slurry. Well known methods of producing zinc compounds by the addition of the appropriate acid can be used in the current invention.

The zinc compounds can be manufactured by the invention directly without having to suspend or dissolve the dry zinc oxide. Synthesis of zinc compounds by this method also obviates the need to dry zinc oxide obtained from the purification process described above. Both simple commodity chemicals and specialty products having a particular physical or chemical properties can easily be made by employing this process in conjunction with the methods to control particle size of the zinc oxide described above.

Example 13

A stoichiometric quantity of sulfuric acid was added to the zinc oxide aqueous slurry. The zinc oxide dissolved to give a zinc sulfate solution. Zinc sulfate solution is used in rayon manufacture and in agriculture.

Example 14

A slight stoichiometric excess of stearic acid was added to the zinc oxide aqueous slurry. It was heated with agitation to 60° C. to melt the stearic acid. As the melt temperature is approached, the stearic acid reacted with the zinc oxide to produce fine particle size zinc stearate. Fine particle size zinc stearate is used in the rubber and paint industries.

Although the present invention has been described in accordance with particular embodiments, it will be apparent to those skilled in the art that the embodiments discussed above are merely exemplary and that modifications can be made to the processes discussed above which are within the spirit and scope of the present invention.

What is claimed is:

1. A method for producing a usable iron product from a waste materials stream which comprises iron compounds and non-iron compounds, comprising the steps of:

subjecting the waste materials stream to a separation process whereby a first portion of the waste materials stream comprising a portion of the iron compounds is separated from the remainder of the waste materials stream comprising a portion of the iron and the non-iron compounds;

briquetting the first portion of the waste materials stream with carbon at a temperature ranging from approximately 50° F. to 250° F. to produce briquettes comprising iron compounds; and providing the resulting briquettes to a furnace to convert the iron compounds in the briquettes into a usable iron product.

2. The method of claim 1, wherein said separation process is a flotation separation process.

3. The method of claim 1, wherein said separation process is a magnetic separation process.

4. The method of claim 1, wherein the furnace further produces exhaust fumes comprising iron compounds and non-iron compounds.

5. The method of claim 1, wherein said furnace is a reduction furnace which converts the iron compounds into direct reduced iron.

6. The method of claim 1, wherein said furnace is an iron production furnace which converts the iron compounds into pig iron.

7. The method of claim 6, wherein said furnace is a small scale blast furnace which converts the iron compounds into pig iron.

8. The method of claim 6, wherein said furnace is a cupola furnace which converts the iron compounds into pig iron.

9. The method of claim 1, further comprising the step of providing the remainder of the waste materials stream to a leaching process.

10. The method of claim 9, wherein the remainder of the waste materials stream is leached with a leachant such that a portion of the non-iron compounds goes into solution and the iron compounds do not go into solution.

11. The method of claim 10, wherein the iron compounds are separated from the solution and the remainder of the waste materials stream and are provided to the briquetting step.

12. The method of claim 9, wherein the leachant is selected from the group consisting of ammonium chloride and sodium hydroxide.

13. The method of claim 1, further comprising the step of providing the briquettes to a grinding process wherein the briquettes are ground into particles smaller than the briquettes, and the particles are provided to the separation process.

14. The method of claim 4, wherein said exhaust fumes are provided to the leaching process.

15. The method of claim 11, wherein the solution and the remainder of the waste materials stream are subjected to further processes for the recovery of metal and chemical values contained in the solution and the remainder of the waste materials stream.

16. The method of claim 5, wherein a portion of the direct reduced iron is provided to an iron production furnace which converts the iron compounds into pig iron.

17. The method of claim 16, wherein the furnace further produces exhaust fumes which are captured and provided to the leaching process.

18. The method of claim 1, further comprising the step of combining the waste materials stream with a secondary waste materials stream which comprises iron poor constituents.

19. The method of claim 1, further comprising the step of combining the waste materials stream with a secondary waste materials stream which comprises iron rich constituents.

20. The method of claim 1, further comprising the step of preroasting the waste materials stream at a temperature of between about 980° C. and 1315° C. prior to subjecting the waste materials stream to the separation process.

21. The method as claimed in claim 12, wherein the concentration of said ammonium chloride solution is approximately 23% by weight.

22. The method as claimed in claim 12, further comprising the steps of:

adding zinc metal to the solution whereby any zinc-displaceable metal ions contained within the solution are displaced by said zinc metal and precipitate out of the solution as metals;

separating the metals from the solution and lowering the temperature of the solution thereby precipitating at least a portion of any zinc component of the solution as a mixture of crystallized zinc compounds;

separating the crystallized zinc compounds from the solution and washing the crystallized zinc compounds with a wash water thereby solubilizing certain of the zinc compounds; and separating any remaining crystallized zinc compounds from the solution and drying the remaining crystallized zinc compounds at a temperature of between about 100° C. and 200° C. resulting in the recovery of a zinc oxide product of 99% or greater purity.

23. A method according to claim 4, comprising the steps of:

a. dissolving the exhaust fumes in an intermediate selected from the group consisting of sodium hydroxide, ammonium sulfate, ammonium chloride liquor, ammonium phosphate, potassium hydroxide, ammonia/ammonium oxalate, and ammonia/ammonium carbonate solutions;

b. filtering out any undissolved materials;

c. precipitating zinc oxide crystals out of the intermediate in a controlled manner such that the zinc oxide crystals have predetermined purity and particle characteristics, by diluting the intermediate solution by adding the solution in droplets of predetermined size to water; and d. filtering out said zinc oxide crystals.

24. The method of claim 23 wherein the intermediate solution is diluted by a factor ranging from 3 to 30 at a temperature ranging from 70° C. to 100° C.

25. The method of claim 24 wherein the solution is diluted by a factor of 3–8 at a temperature of approximately ranging from 80° C. to 100° C.

26. A method for producing a usable iron product from a waste materials stream which comprises iron compounds and non-iron compounds, comprising the steps of:

briquetting the waste materials stream with carbon at a temperature ranging from approximately 50° F. to 250° F. to produce briquettes comprising iron compounds;

providing the resulting briquettes to a furnace which converts the iron compounds in the briquettes into a usable iron product and which produces an exhaust fume which comprises iron and non-iron compounds;

providing the exhaust fumes to a leaching process wherein the exhaust fumes are leached with a leachant such that a portion of the non-iron into solution and the iron compounds do not go into solution; and separating the iron compounds from the solution and providing the iron compounds to the briquetting step.

27. The method of claim 26, further comprising the step of providing the briquettes to a grinding process wherein the briquettes are ground into particles smaller than the briquettes, and the particles are provided to a separation process whereby a first portion of the waste materials stream comprising a portion of the iron compounds is separated from the remainder of the waste materials stream comprising a portion of the iron and the non-iron compounds.

28. The method of claim 27, wherein said separation process is a flotation separation process.

29. The method of claim 27, wherein said separation process is a magnetic separation process.

30. The method of claim 27, wherein said furnace is a reduction furnace which converts the iron compounds into direct reduced iron.

31. The method of claim 27, wherein said furnace is an iron production furnace which converts the iron compounds into pig iron.

32. The method of claim 31, wherein said furnace is a small scale blast furnace which converts the iron compounds into pig iron.

33. The method of claim 31, wherein said furnace is a cupola furnace which converts the iron compounds into pig iron.

34. The method of claim 26, further comprising the step of providing the remainder of the waste materials stream to the leaching process.

35. The method of claim 26, wherein the leachant is selected from the group consisting of ammonium chloride and sodium hydroxide.

36. The method of claim 26, wherein the solution and the remainder of the waste materials stream are subjected to further processes for the recovery of metal and chemical values contained in the solution and the remainder of the waste materials stream.

37. The method of claim 26, further comprising the step of combining the waste materials stream with a secondary waste materials stream which comprises iron poor constituents.

38. The method of claim 26, further comprising the step of combining the waste materials stream with a secondary waste materials stream which comprises iron rich constituents.

39. The method of claim 26, further comprising the step of providing the waste materials stream to the leaching process prior to providing the waste materials stream to the briquetting process.

40. The method of claim 26, further comprising the step of preroasting the waste materials stream at a temperature of between about 980° C. and 1315° C. prior to subjecting the waste materials stream to the separation process.

41. The method as claimed in claim 35, wherein the concentration of said ammonium chloride solution is approximately 23% by weight.

42. The method as claimed in claim 36, further comprising the steps of:

adding zinc metal to the solution whereby any zinc-displaceable metal ions contained within the solution are displaced by said zinc metal and precipitate out of the solution as metals;

separating the metals from the solution and lowering the temperature of the solution thereby precipitating at least a portion of any zinc component of the solution as a mixture of crystallized zinc compounds;

separating the crystallized zinc compounds from the solution and washing the crystallized zinc compounds with a wash water thereby solubilizing certain of the zinc compounds; and separating any remaining crystallized zinc compounds from the solution and drying the remaining crystallized zinc compounds at a temperature of between about 100° C. and 200° C. resulting in the recovery of a zinc oxide product of 99% or greater purity.

43. The method of claim 5, wherein a portion of said direct reduced iron is provided to a grinding process wherein the direct reduced iron is ground into particles, and the particles are provided to the separation process.

44. The method of claim 43, wherein said separation process is a magnetic separation process.

45. The method of claim 43, wherein said separation process is a flotation separation process.

46. The method of claim 26, wherein a portion of said direct reduced iron is provided to a grinding process wherein the direct reduced iron is ground into particles, and the particles are provided to the separation process.

47. The method of claim 46, wherein said separation process is a magnetic separation process.

48. The method of claim 46, wherein said separation process is a flotation separation process.

* * * * *